United States Patent [19]

Eguchi

[11] Patent Number: 5,594,460

[45] Date of Patent: Jan. 14, 1997

[54] TRACKING ARRAY ANTENNA SYSTEM

[75] Inventor: Kouichi Eguchi, Mitaka, Japan

[73] Assignee: Japan Radio Co., Ltd., Tokyo, Japan

[21] Appl. No.: 556,098

[22] Filed: Nov. 9, 1995

[30] Foreign Application Priority Data

Nov. 16, 1994 [JP] Japan ................................. 6-282321
Oct. 6, 1995 [JP] Japan ................................. 7-260273

[51] Int. Cl.⁶ ................................................. H01Q 3/00
[52] U.S. Cl. ........................... 343/765; 343/757; 342/359
[58] Field of Search .................................... 343/765, 763, 343/757, 758; 342/359, 371, 75, 77, 352, 372, 354; H01Q 3/00

[56] References Cited

U.S. PATENT DOCUMENTS

| | | | |
|---|---|---|---|
| 5,223,845 | 6/1993 | Eguchi | 342/359 |
| 5,227,806 | 7/1993 | Eguchi | 343/765 |
| 5,359,337 | 10/1994 | Eguchi | 343/765 |
| 5,419,521 | 5/1995 | Matthews | 343/765 |
| 5,420,598 | 5/1995 | Uematsu et al. | 343/765 |
| 5,517,204 | 5/1996 | Marakoshi et al. | 343/765 |

FOREIGN PATENT DOCUMENTS

| | | |
|---|---|---|
| 4-64074 | 2/1992 | Japan . |
| 4-46706 | 4/1992 | Japan . |
| 4-119407 | 4/1992 | Japan . |
| 4-205507 | 7/1992 | Japan . |
| 4-242184 | 8/1992 | Japan . |
| 4-48282 | 9/1992 | Japan . |
| 4-291183 | 10/1992 | Japan . |
| 4-291805 | 10/1992 | Japan . |
| 4-278703 | 10/1992 | Japan . |
| 4-315301 | 11/1992 | Japan . |
| 5-196475 | 8/1993 | Japan . |
| 5-232206 | 9/1993 | Japan . |
| 6-13810 | 1/1994 | Japan . |
| 6-66118 | 9/1994 | Japan . |

OTHER PUBLICATIONS

Electronic Information Communications Society, National Spring Convention, 1988, B–116, "8 Elements Spiral Array Antenna for Mobile Satellite Communications", Akio Kuramoto et al., p. 116 (with English–language abstract) no month.

*Primary Examiner*—Hoanganh T. Le
*Attorney, Agent, or Firm*—Oliff & Berridge

[57] ABSTRACT

A tracking array antenna system is provided. When a signal from the target is received normally, control mode of an AZ axis and an electronic XEL axis is changed over according to whether or not a moving platform is inclined about the XEL axis for detecting inclination of the moving platform. When the moving platform is not inclined, beam-switch (BSW) about the electronic XEL axis is performed, and the beam-switch tracking (BST) about the AZ axis using the result with an angular rate feedback (ARFB) is performed. When the moving platform is inclined, zero rate control (ZRC) about the AZ axis and BST about the electronic XEL axis are performed. In this way, tracking and stabilization are performed without not only the gimbal-lock but also the use of a gyrocompass.

7 Claims, 17 Drawing Sheets

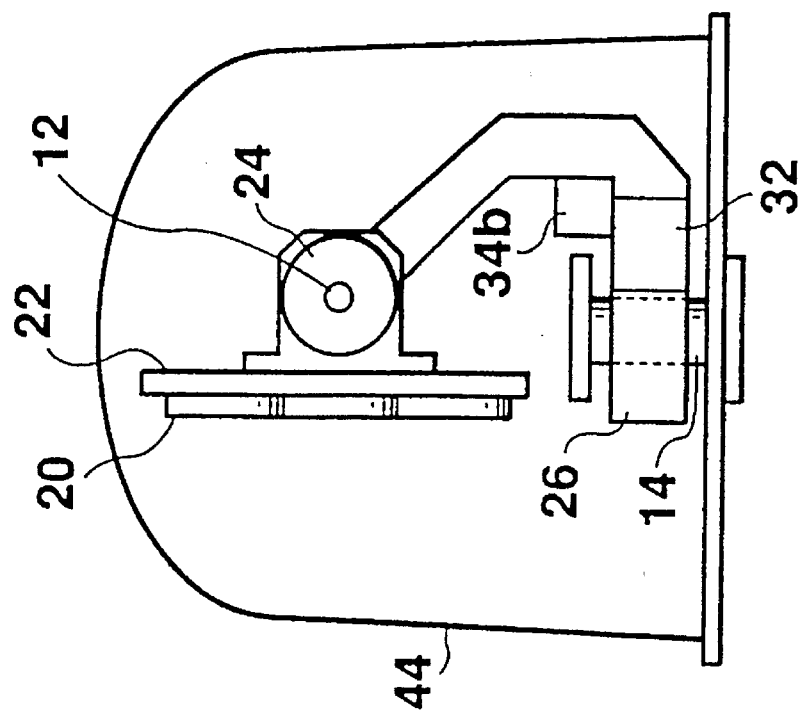
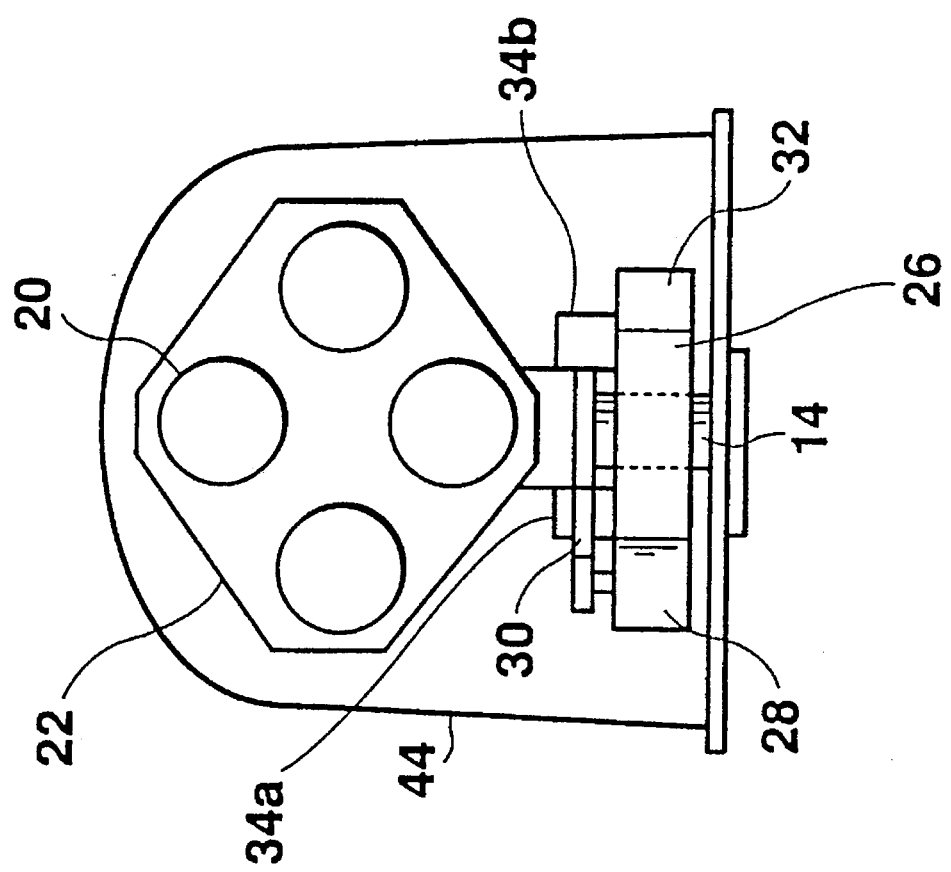
Fig. 1B
Fig. 1A

TRACKING ARRAY ANTENNA SYSTEM

BACKGROUND OF THE INVENTION a) Field of the Invention

This invention relates to an array antenna system suitable for mounting on a moving platform such as a ship, and having functions for tracking a target.

b) Description of the Related Art

A stabilized tracking array antenna system tracks a target (e.g. a satellite) while stabilizing an array antenna against the inclination of a moving platform on which it is mounted. Such systems are used, for example, as ship earth stations in the maritime satellite communication managed by INMARSAT (International Maritime Satellite Organization).

An example of a stabilized tracking array antenna system having a construction wherein a parabola antenna is supported by the AZ-EL-XEL mount is shown in FIG. 21, in which a mechanical elevation (EL) axis 12 is pivotally supported by a mechanical azimuth (AZ) axis 14, a mechanical cross-elevation (XEL) axis 10 is pivotally supported by the EL axis 12, and the parabola antenna is pivotally supported by XEL axis 10. Alternatively, the parabola antenna may be supported by an AZ-EL mount, i.e. a simplified mount wherein the mechanical XEL axis 10 is absent.

When using a phased array antenna in place of the parabola antenna, the antenna may be provided with an AZ-EL-virtual XEL mount wherein the AZ axis 14 and EL axis 12 are mechanical, but the XEL axis 10 is virtual. The virtual axis may be implemented by a beam direction control using variable phase-shifters (hereinafter referred as "PSs") about the virtual axis which is perpendicular to the mechanical EL axis 12 and thus the AZ-EL-virtual XEL mount seems similar to the AZ-EL mount in appearance. Systems proposed by the Applicant employ such an AZ-EL-virtual (electronic) XEL mount (see Japanese Patent Application Laid-Open Publication Nos. Hei 4-278703 and 4-315301). The AZ-EL-virtual XEL mount is simpler in its mechanism than that of the AZ-EL-XEL mount, and a tracking error when the elevation of the target is high and the inclination of the moving platform is smaller than that of an AZ-EL mount. The systems proposed by the Applicant, however, all need to input a signal indicating the azimuth of a target (e.g. a satellite) from an external device such as a gyrocompass in order to steer the AZ axis 14 according to the target azimuth.

SUMMARY OF THE INVENTION

It is therefore an object of this invention to achieve stabilization and precise tracking without inputting azimuth information from an external device. This object is achieved by improving the azimuth control of the array antenna. It is a further object of this invention to keep the mechanical construction of the mount simple, and prevent gimbal locking. It is a still further object of this invention to permit continuous tracking about the azimuth axis even when there is blocking or shadowing of the signal from the target.

This invention directs to a tracking array antenna system suitable to be mounted on a moving platform, and comprises an array antenna mechanically supported by an AZ-EL mount and whose beam direction around the first virtual XEL axis is switched over so that the beam points to any one of a plurality of beam positions at a time, the first virtual XEL axis being a virtual axis (e.g. electronic axis) perpendicular to the mechanical EL axis. This invention further comprises beam-switch (BSW) means for forming the beam around the first virtual XEL axis so as to direct alternately toward at least two beam positions selected from the plurality of beam positions (BSW). The BSW means extracts information about tracking error about the first virtual axis which varies insynchronous with the beam-switch, e.g. information about the received signal level or an integral value thereof, etc., and generates a tracking signal based on this information. This invention further comprises means for directly or indirectly detecting the inclination angle of the moving platform about a second virtual XEL axis which is perpendicular to the mechanical EL axis, and for generating a first inclination angle signal based thereon.

This invention further comprises AZ axis beam-switch tracking (AZBST) means for determining from at least the first inclination angle signal whether or not the moving platform on which the array antenna is mounted (practically is an AZ turntable or the like) is substantially not inclined about the second virtual XEL axis (i.e. whether or not the inclination angle of the moving platform about the second virtual XEL axis is substantially zero or lies within a predetermined range including zero), and for steering the AZ axis according to the tracking signal so that the azimuth of the antenna bearing approaches is the azimuth of the target when determined as "not inclined". In other words, since, when the moving platform is not inclined around the second virtual XEL axis, the bearing error in appearance due to the inclination of the moving platform is in principle extremely small antenna bearing control is performed without causing a gimbal lock by performing the BSW and AZBST based on the tracking signal.

According to this invention, as the mount comprises two mechanical axes and one virtual axis, the antenna drive mechanism is simpler than an AZ-EL-XEL mount where all the axes are mechanical axes, making the system more lightweight, and making it easier to manufacture. Further, it is not necessary to input azimuth information from an external source. Still further, tracking is performed using a signal received from the target by the array antenna, so the target can be tracked precisely. The second virtual XEL axis may be identical to the first virtual XEL axis, but it is preferable to take it in a horizontal plane on the AZ axis turntable.

According to the second aspect of this invention, preferably, there is further provided in addition to the first aspect, XEL axis control means for forming the beam around the first virtual XEL axis based on the inclination angle of the moving platform about the second virtual XEL axis when it is determined from the first inclination angle signal that the moving platform is inclined to the second virtual XEL axis. Both the first and second virtual XEL axes are perpendicular to the EL axis, hence the inclination to the second virtual XEL axis can be converted to a control angle about the first virtual XEL axis by relatively simple computation. According to this aspect, therefore, even when the moving platform is inclined to the second virtual XEL axis, the signal is received from the target under favorable conditions when tracking is performed, and suitable stabilization can be made against the inclination. Instead of directly detecting the inclination angle about the second virtual XEL axis, it can be calculated using equations (10) and (11) from the output of two inclination angle detectors fixed to the moving platform (and the antenna bearing angle). The first and second virtual XEL axes may be identical to each other.

According to the third aspect of this invention, there is further provided in addition to the first aspect, cross-elevation axis beam-switch tracking (XELBST) means, when it is determined from the first inclination angle signal that the moving platform is inclined around the second virtual XEL axis, for updating a combination of at least two beam positions selected by the BSW means according to the tracking signal, so that the array antenna receives the signal from the target under preferable receiving conditions. The target can therefore be tracked by the array antenna even when the moving platform is inclined about the second virtual XEL axis.

According to the fourth aspect of this invention, there is further provided in addition to the first aspect, AZ axis angular rate detecting means which produces an angular rate signal indicating a rotation angular rate of the array antenna about the AZ axis, and AZ axis angular rate feedback control (ARFB) means which supplies a modified tracking signal, obtained by combining an angular rate signal and a tracking signal, to the AZBST means instead of the aforesaid tracking signal when it is determined from the first inclination angle signal that the moving platform is inclined about the second virtual XEL axis. According to this aspect, therefore, since the angular rate feedback is constantly applied to the control system of the AZ axis, zero rate control (ZRC) is performed on the AZ axis while the AZBST is not performed. In other words, the AZ axis is rate-controlled so that the angular rate about the AZ axis of the array antenna approaches 0. By using ZRC for the AZ axis in this way, the target can be continuously tracked even when there would be a large apparent azimuth error due to inclination, as for example is the case when the moving platform is inclined about the second virtual XEL axis. On the other hand, ZRC only cancels out the effect of turning of the moving platform, so it cannot compensate the motion of the target. According to this invention, by performing AZBST with ARFB when possible. This permits the target to be tracked as appropriate about the AZ axis. According to this aspect, therefore, the array antenna is stabilized and the target is accurately tracked without inputting azimuth information from an external source and while preventing gimbal lock. The stability of the control system is also improved by ARFB.

According to the fifth aspect of this invention, in addition to the fourth aspect, there is provided offset voltage suppression means which generates an offset voltage suppressed angular rate signal by eliminating or attenuating the offset voltage component in the angular rate signal, and supplies this offset voltage suppressed angular rate signal to the ARFB means as an angular rate signal. According to this aspect, an angular rate signal from which the offset voltage component has been suppressed is used, hence an angular rate sensor having a relatively low performance, i.e. whose output contains an offset voltage but which is economical, may be employed so that the cost of the system is reduced. Further, according to this aspect, the cumulative error during ZRC is corrected by the AZBST means, so even if an angular rate sensor for which the detection precision is not so high is used as AZ axis angular rate detecting means, its disadvantage is kept to a minimum.

According to the sixth aspect of this invention, in addition to the first aspect, there is further provided search-control means that steers the AZ axis and/or EL axis so that the position of the target can be found even when signal receiving quality from the target deteriorates over a predetermined time or longer. According to this aspect, therefore, even when it appears the target has been lost as a result of receiving signal quality deteriorating due to blocking, etc., the target can be captured and tracked again.

According to the seventh aspect of this invention, in addition to the first aspect, there are further provided inclination angle detecting means for generating a second inclination angle signal indicating an inclination angle about the EL axis, and EL axis control means for stabilizing the array antenna against inclination to the EL axis by steering the array antenna about the EL axis while performing a step-track (control of antenna position in which receiving signal quality from the target is improved by varying the antenna position by stepwise in steps of the predetermined intervals), according to the inclination angle signal. According to this aspect, therefore, the target can be tracked appropriately about the EL axis.

BRIEF DESCRIPTION OF THE DRAWINGS

FIGS. 1A and 1B are respectively a front view and view in profile showing the external appearance of an array antenna system having four elements according to this invention.

DETAILED DESCRIPTION OF THE PREFERRED EMBODIMENTS

Figure 21:
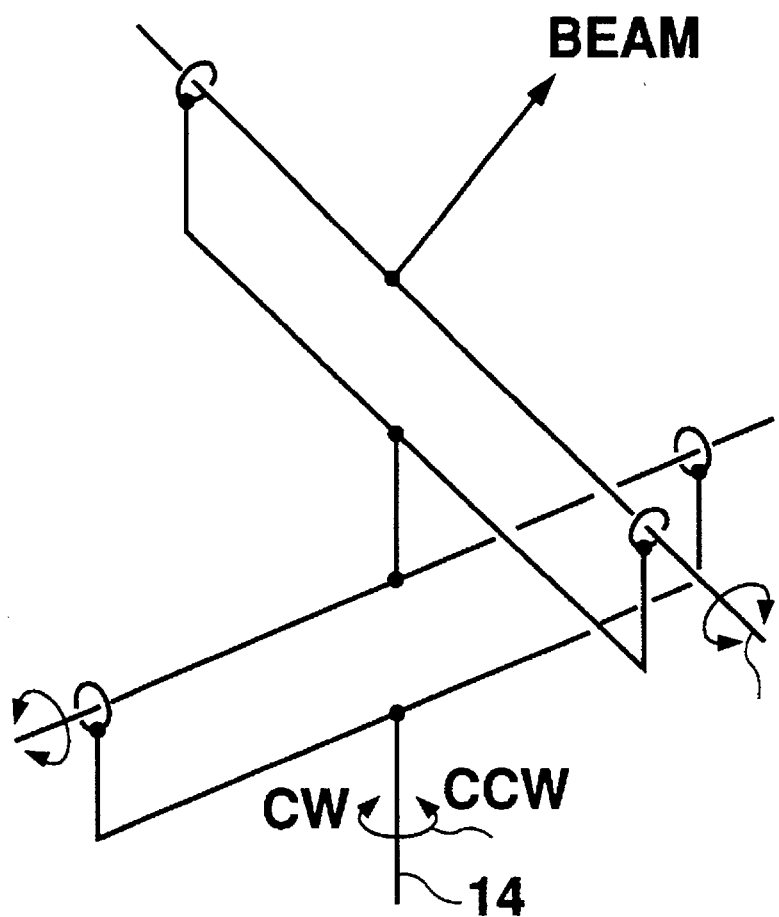
FIG. 21 is a diagram showing an AZ-EL-XEL mount.

Some preferred embodiments of this invention will now be described with reference to the appended drawings. Parts of the construction which are identical to or correspond with those of FIG. 21 are given identical symbols, and their description is omitted.

a) External appearance and construction of mechanical axes

Figure 2B:
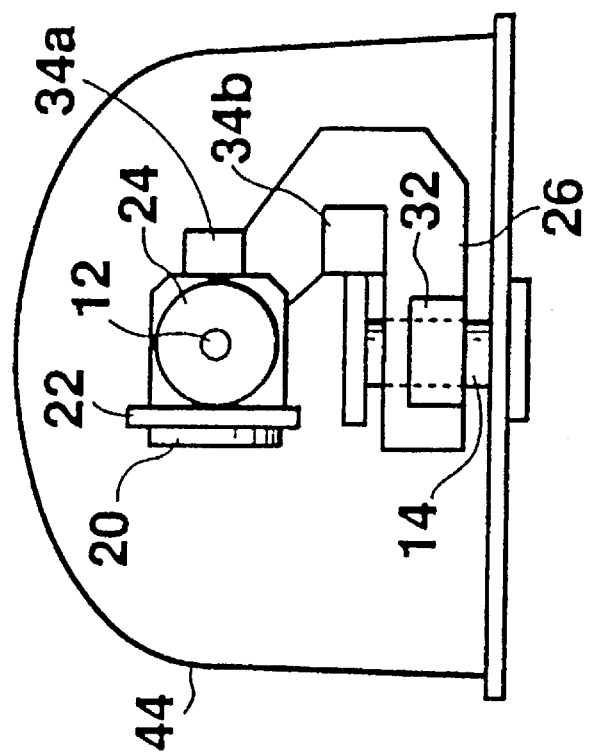
FIGS. 2A and 2B are respectively a front view and view in profile showing the external appearance of an array antenna system having three elements according to this invention.
Figure 2A:
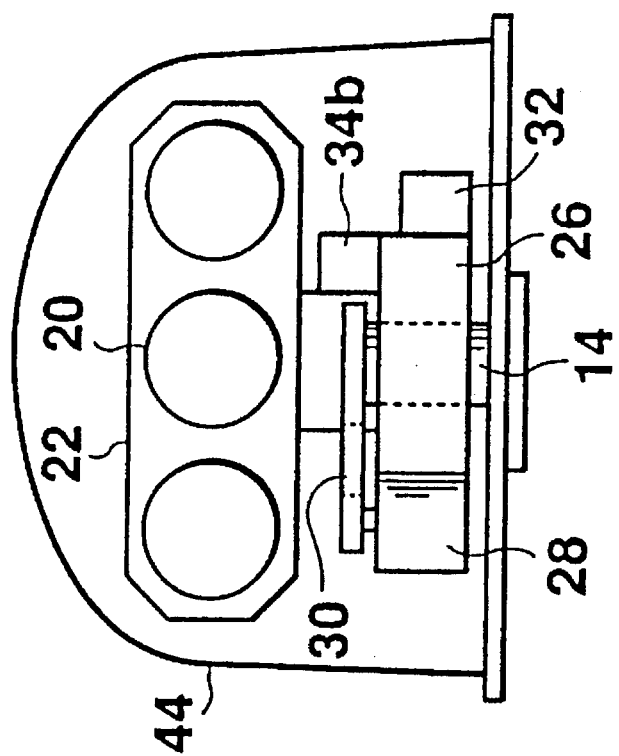

In the four element system whereof the external aspect is illustrated in FIG. 1A and FIG. 1B, four antenna elements 20 are arranged in three columns on a base plate of an array antenna 22. The two center elements 20 are disposed at positions which are offset to the top and bottom in the figure with respect to the elements 20 in the left and right columns. This four-element, three-column arrangement makes it possible to reduce the distance between adjacent columns while maintaining a certain distance between adjacent elements, consequently the array antenna 22 as a whole can be made more compact (Japanese Patent Laid-Open Publication No. Hei 4-278703). Moreover, as there are two elements in the center columns and only one each on the left and right, i.e. as there are more elements in the center column than in the left and right columns, sidelobes around the electronic XEL axis are suppressed and a broad beam there around is obtained. In the three-element arrangement whereof the external aspect is shown in FIG. 2A and FIG. 2B, there is only one element 20 in the center column. Using this three element, three-column arrangement with no offset, the height of the device can be reduced in comparison to the four-element arrangement.

In either of the aforesaid examples, the mount comprises only two mechanical axes, i.e. the AZ axis 14 and EL axis 12, so it has a simple mechanism as will now be described. First, the array antenna 22 is steered around the EL axis 12 which is fixed to an AZ axis turntable 26 by an EL axis motor 24 fixed to the rear surface of the array antenna 22. Alternatively, the EL axis motor 24 may be fixed to the AZ axis turntable 26, and the EL axis 12 fixed to the array antenna 22. An AZ axis motor 28 whereof the output shaft is connected to the AZ axis 14 via a belt 30 and a pulley, not shown, is fixed to the AZ axis turntable 26 which can be rotated through 360 degrees or more around the AZ axis 14. The AZ axis turntable 28 can therefore be rotated by the AZ axis motor 28, and the array antenna 22 with the EL axis 12 can be steered about the AZ axis 14. The AZ axis motor 28 may also be fixed to the base of a radome 44.

Figure 3:
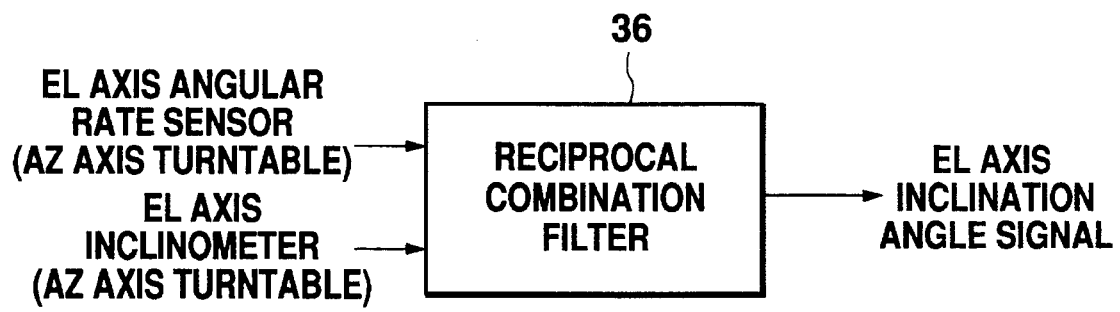
FIG. 3 is a block diagram showing one example of a filter for combining sensor outputs.
Figure 4:
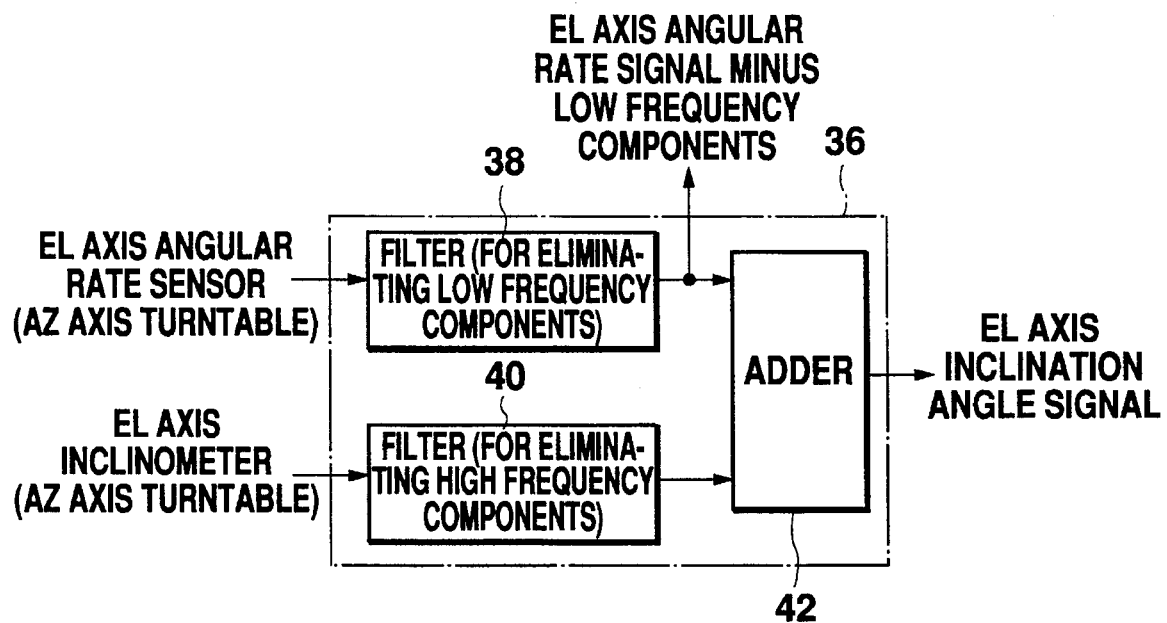
FIG. 4 is a block diagram showing the detailed construction of FIG. 3.
Figure 10:
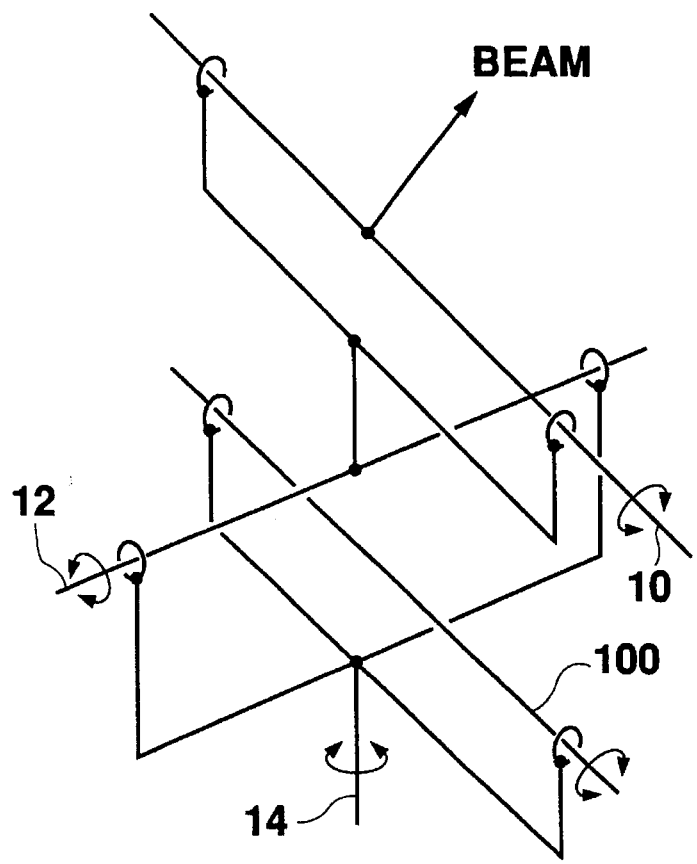
FIG. 10 is a diagram for the purpose of describing the virtual XEL axis about which the inclination of the moving platform is detected.

An AZ axis angular rate sensor 32 and inclination detectors 34a, 34b are fixed to the AZ axis turntable 26. The AZ axis angular rate sensor 32 comprising a vibratory rate gyro or the like, detects the rotation angular rate of the moving platform around the AZ axis 14. Each of the inclination detectors 34a, 34b comprises an angular rate sensor such as a vibratory rate gyro which detects the rotation angular rate of the moving platform around the EL axis 12 or a virtual XEL axis 100 for detecting the inclination of the moving platform (FIG. 10), an inclinometer for detecting the inclination angle of the moving platform about the EL axis 12 and virtual XEL axis 100, and means for combining the outputs of this angular rate sensor and inclinometer. The detectors 34a, 34b output the result of combination, i.e. the inclination angle of the moving platform around the EL axis 12 or virtual XEL axis 100. The aforesaid combining means may for example be a reciprocal combination filter 36 shown in FIG. 3 and FIG. 4. The reciprocal combination filter 36 comprises a filter 38 through which suppresses the low frequency components of the angular rate detected by the angular rate sensor, a filter 40 through which suppresses the high frequency components of the inclination angle signal detected by the inclinometer, and an adder 42 for summing the outputs of the filter 38 and the filter 40 (Japanese Patent Laid-Open Publication No. Hei 5-196475). These inclination detectors 34a, 34b may also be directly fixed to the AZ axis turntable 26, or to a structure which supports the EL axis 12 as shown in FIG. 2A and FIG. 2B.

The aforesaid structure is covered by a radome 44 formed of FRP (fiber reinforced plastic) so as to protect it from wind, rain, etc. The base of the radome 44 is used for fixing the array antenna 22 to the moving platform on which it is to be mounted, e.g. a ship, and to supply the antenna with power and signal cables.

b) Electronic XEL axis

Figure 5:
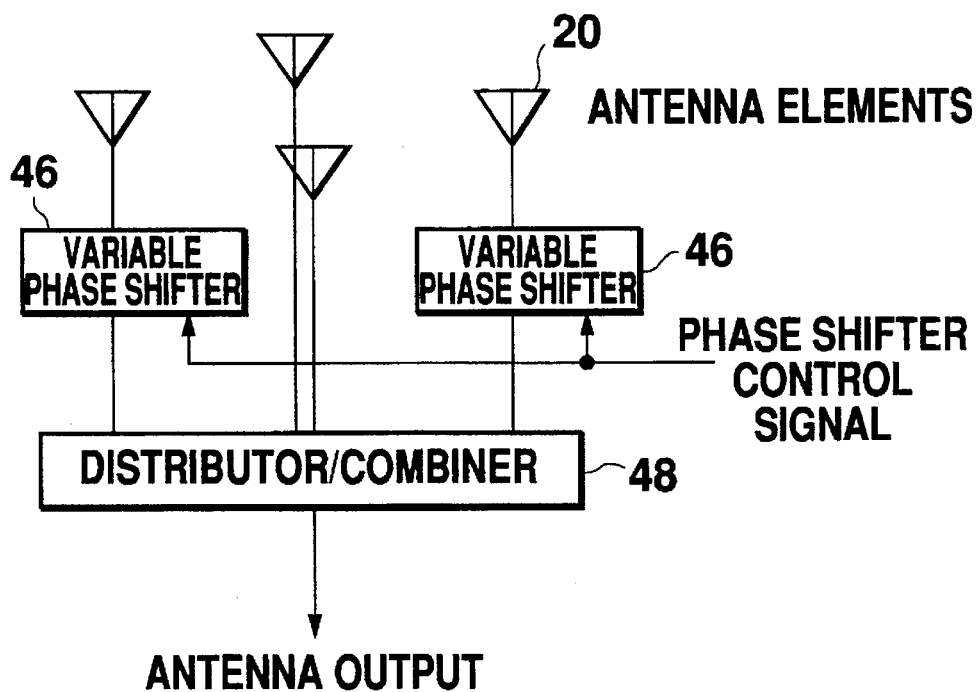
FIG. 5 is a block diagram showing one example of the construction of an array antenna feeding circuit in the antenna system shown in FIG. 1.

The layout of the feeding circuit mounted on the rear surface of the array antenna 22 in the arrangement of FIG. 1A and FIG. 1B, is shown in FIG. 5. A distributor/combiner 48 is directly connected to two elements 20 in the center column and connected via PSs 46 to the two elements 20 in the left and right columns. The distributor/combiner 48 distributes signals to be transmitted to the elements 20, and combines signals received from the elements 20 and outputs the combined signal. The phase shifts produced by the PS's 46 are controlled by a phase shift control signal (referred to hereinafter as PS control signal) supplied by a beam-switch tracking controller (referred to hereinafter as BST controller) so as to switch the beam of the array antenna 22 about the electronic XEL axis to direct to a point selected among a plurality of beam positions.

Figure 6:
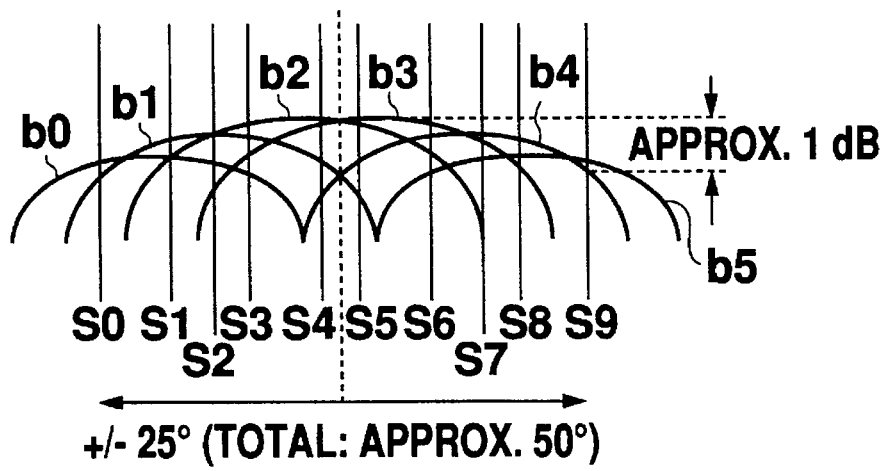
FIG. 6 is a diagram showing beam positions about an electronic XEL axis of the array antenna.

Consider for example 3 bit PSs 46 whose phase shifts are controlled in accordance with 3 bit PS control signals. In this case, the direction of the beam about the electronic XEL axis can be switched to direct to any one of a maximum of $2^3=8$ positions. Here, assume that six beams b0–b5 shown in FIG. 6 are produced by the 3 bit PSs 46, that the center frequency of the elements 20 is 1550 MHz, that the substrate of the array antenna 22 has a high dielectric constant, and that the elements 20 have broad 3 dB beam width of approximately 90 degrees. Under these assumptions, a angular range of +/–25 degrees, i.e. targets represented by S0–S9 can be covered by anyone of the beams b0–b5 with a drop in gain of 1 dB or less. Using an array antenna 22 of the aforesaid construction, the electronic XEL axis can be implemented while keeping the number of PSs 46 to a minimum, and while suppressing losses and phase jumps (transient phase fluctuations produced when the phase shift is switched over digitally).

c) Functional layout of the first embodiment

Figure 7:
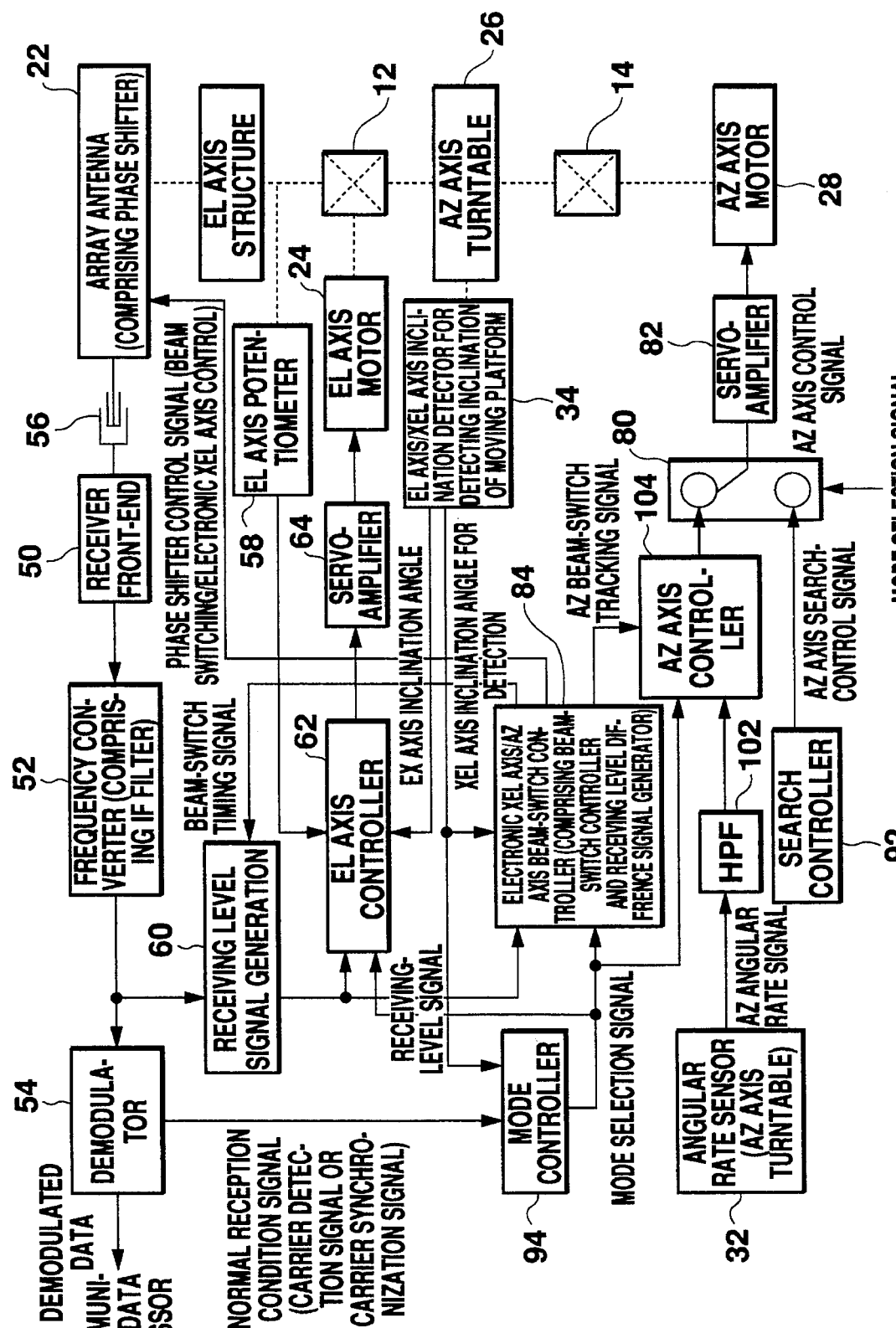
FIG. 7 is a full block diagram showing the functional layout of an array antenna system according to a first embodiment of this invention.

A functional scheme according to the first embodiment of this invention that can be applied to both the four-and three-element constructions is shown in FIG. 7. In this figure, the array antenna 22 is used to receive signals from a target such as a satellite. The inclination detectors 34a, 34b are here represented together by an EL/XEL axes inclination detector 34 for detecting the inclination of the moving platform.

c. 1) Received signal processing system

The signal received by the array antenna 22 is amplified by a receiver front-end 50, converted from a radio frequency to an intermediate frequency (IF) by a frequency converter 52, and after filtering by an IF filter built in the frequency converter 52, is supplied to a demodulator 54. The demodulator 54 demodulates data to be supplied to a communications data processor, shown not now but in a later stage from the IF signal supplied by the frequency converter 52 and outputs a normal reception condition signal indicating that the signal from the target has been received under good conditions, e.g. a carrier detection signal representing that a carrier has been detected from the IF signal, and a carrier synchronization signal generated from the IF signal. To situate the blocks 50–54 on the radome base or outside the radome 44, a rotary connector 56 is interposed between the array antenna 22 and receiver front-end 50 and situated in the AZ axis 14. The rotary connector 56 maintains good electrical contact even though the AZ axis turntable 26 rotates through a wide angle of for example 360 degrees or more.

c. 2) EL axis control

An EL axis potentiometer 58 provided in the vicinity of the EL axis 12 detects an elevation angle of the array antenna 22 with respect to from the horizontal plane. The inclination detector 34a outputs an inclination angle about the EL axis 12 of the moving platform. An EL axis controller 62 adds the elevation angle (satellite elevation) detected by the EL axis potentiometer 58 and the inclination angle about the EL axis 12 detected by the inclination detector 34a, supplies a drive signal to the EL axis motor 24 via a servo- amplifier 64 based on the result of adding, and thereby controls the angular position of the EL axis 12. The EL axis controller 62 performs step-track control using receiving-level signal generated by a receiving-level signal generator 60, the step-track control about the EL axis 12 being a steering control of the EL axis 12 which is carried out by stepwisely and repeatedly increasing and decreasing the elevation angle of the array antenna by a small angle, by detecting the elevation in which the signal receiving-level is improved, and by steering the EL axis 12 so as to increase the signal receiving-level (Japanese Patent Laid-Open Publication Nos. Hei 4-64074 and Hei 4-119407).

The receiving-level signal generator 60 which is shown in detail in FIG. 8 generates a receiving-level signal necessary to perform step-track control and the control described hereinafter. As mentioned hereinabove, an IF filter 78 built into the frequency converter 52 performs narrow band pass filtering on the received converted IF signal. A square-law detector 66 built in the receiving-level signal generator 60 generates an analog signal indicating the signal receiving level, i.e. a pre-receiving-level signal, by performing square-law detection on the output of the IF filter 78. An A/D converter 70 converts the pre-receiving-level signal from analog to digital. An integrate-and-dump circuit 72 discharges according to an integrate-and-dump timing signal received from an integrate-and-dump timing generator 74, and integrates the pre-receiving-level signal until the next integrate-and-dump timing signal. The integrate-and-dump timing generator 74 generates an integrate-and-dump timing signal in responsive to a beam-switch (referred to hereinafter as a BSW) timing signal, i.e. in synchronism with a BSW timing described hereinafter. The EL axis controller 62 performs step-track control based on the receiving-level signal, i.e. the signal representing the result of integration by the integrate-and-dump circuit 72 immediately prior to generation of the integrate-and-dump timing signal.

c. 3) AZZRC

Figure 9:
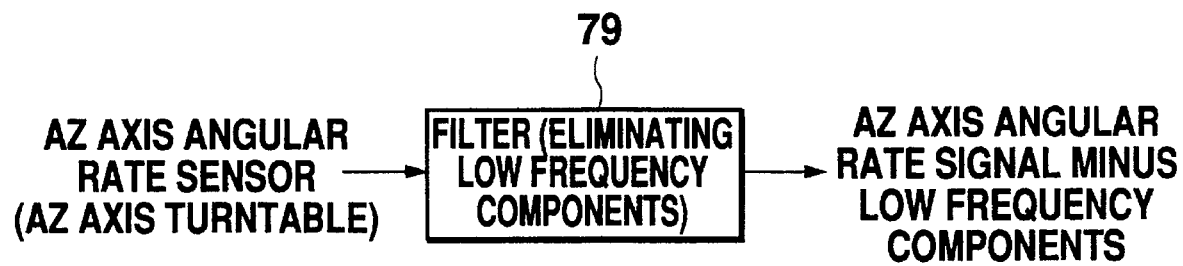
FIG. 9 is a block diagram showing the construction of a filter for removing the low frequency components from the AZ axis rate sensor output.

When signal reception is interrupted for a short time due to blocking, etc., or when the moving platform is substantially inclined about the virtual XEL axis 100, the angular rate of the AZ axis 14 is controlled by the ZRC method, using an angular rate sensor 32, an HPF 102, and an AZ axis controller 104. The HPF 102 eliminates the low frequency components from the output of the angular rate sensor 32 by high pass filtering using a built-in filter 79 (FIG. 9). The AZ controller 104 generates an AZ axis control signal based on the angular rate signal from which the low frequency components have been eliminated, and supplies the AZ axis control signal to a servo-amplifier 82 via an AZ axis control switch 80 to drive the AZ axis motor 28 by the amplified AZ axis control signal. As a result of the ZRC, the attitude of the array antenna 22 with respect to the AZ axis 14 is maintained relative to the ground or the horizontal plane even if the moving platform is turning.

The ZRC around the AZ axis 14 can be performed even without using the signal received from the target. Therefore, even when blocking or shadowing occurs, or even when signals are transmitted intermittently as during burst transmission, the target can be tracked around the AZ axis 14 by the array antenna 22 as long as the time of blocking etc. is short. Eliminating the low frequency components from the angular rate signal allows the use of a rate sensor having low sensitivity and a relatively large offset voltage, and hence the cost can be reduced since the sensor 32 is economical. When the cost is not a concern and therefore an angular rate sensor that is expensive but having a high sensitivity and small offset voltage can be used, a circuit which assigns a dead zone eliminating offset voltages may be used in place of the filter 78 of this embodiment.

c. 4) AZBST

When the moving platform is inclined about the virtual XEL axis for detecting inclination, the AZ axis 14 is steered on the basis of BSW around the electronic XEL axis, in this embodiment. In order to perform this control, i.e. to perform BST around the AZ axis 14, a BSW controller 84 of the electronic XEL and AZ axes and the AZ controller 104 are provided.

The BSW controller 84 selects any desired pair, and preferably a pair ($b_2$, $b_3$) of beam positions each of which lies in the center and therefore has a relatively small loss, from the five combinations of adjacent pairs ($b_0$, $b_1$), ($b_1$, $b_2$), ($b_2$, $b_3$), ($b_3$, $b_4$), ($b_4$, $b_5$) of six beam positions b0–b5 shown in FIG. 6. The BSW controller 84 supplies PS control signals to the PSs 46 so that the beam of the array antenna 22 around the electronic XEL axis alternately directs to one of the positions in the selected pair, e.g. if ($b_2$, $b_3$) is selected, the beam position to which the beam should be directed is switched between the position $b_2$ and the position $b_3$ over a very short period (e.g. 10 msec), i.e. the BSW between $b_2$ and $b_3$ is performed.

Figure 8:
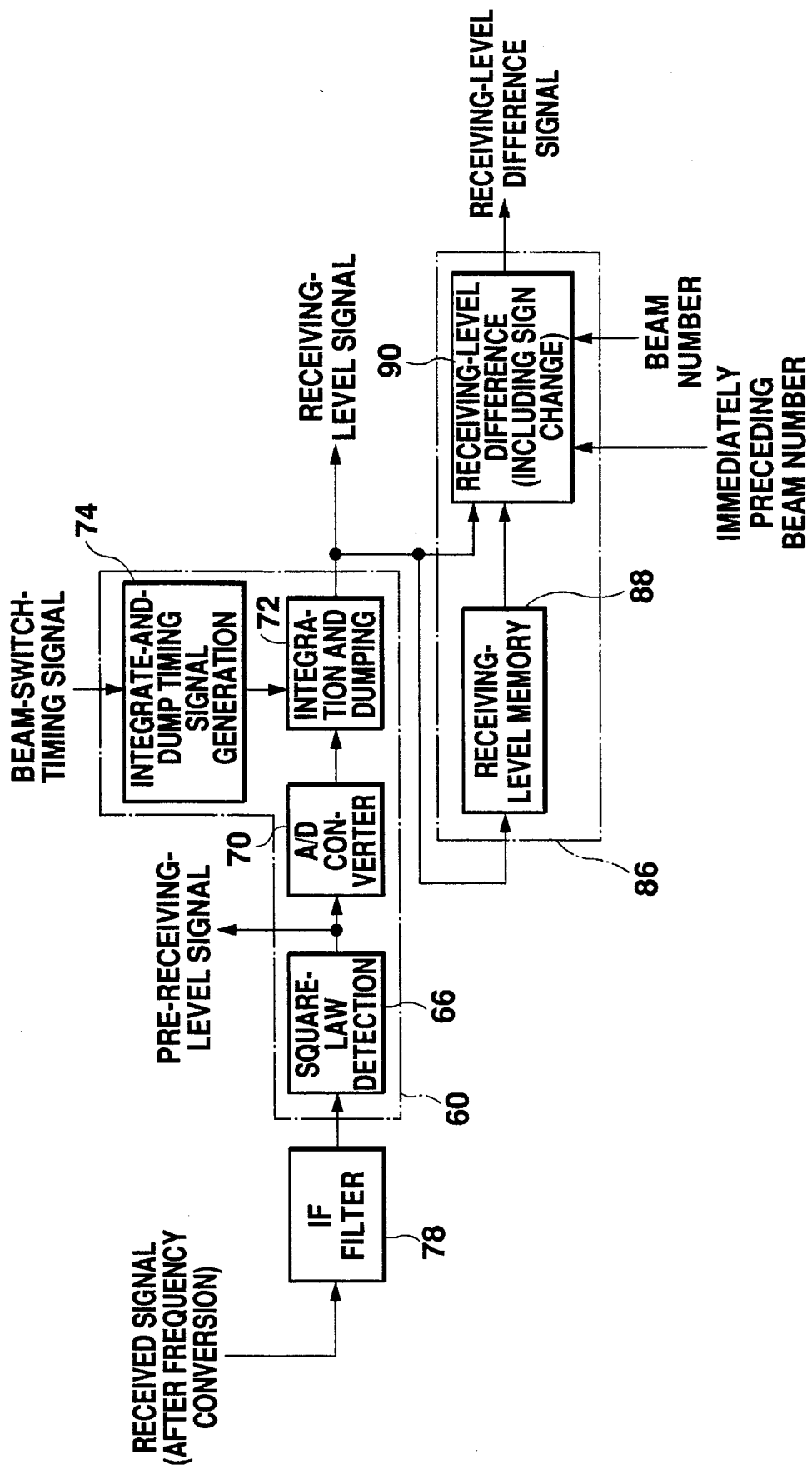
FIG. 8 is a block diagram showing the construction of a receiving-level signal generator and a level difference signal generator.

The BSW controller 84 further comprises a receiving-level difference signal generator 86 shown in FIG. 8, a receiving-level memory 88 built there in storing the value of a receiving-level signal obtained from the integrate-and-dump circuit 72 at least until immediately preceding the next integration period. A receiving-level difference detector 90 generates a receiving-level difference signal indicating by how much the current value of the receiving-level signal has changed relative to the receiving signal level during the immediately preceding integration period by subtracting the contents of the receiving-level signal in the memory 88 from the value of the receiving-level signal obtained from the integrate-and-dump circuit 72 (value immediately prior to discharge). Herein, since discharge by the integrate-and-dump circuit 72 is performed in synchronism with a BSW timing signal indicating beam-switch which is supplied from the BSW controller 84 to an integrate-and-dump timing signal generating circuit 74, the value of the receiving-level difference signal represents the change in the value of the receiving-level signal in one period of the BSW, the value of the receiving-level being measured immediately prior the discharge.

In addition, since the beam number of the receiving-level signal from the circuit 72 and that from the memory 88 are periodically interchanged in synchronism with BSW, the receiving-level difference detector 90 changes the sign of the receiving-level difference signal in synchronism with the BSW. For example, if BSW is performed between the beam position pair ($b_2$, $b_3$), the sign of the receiving-level signal $\Delta RLev(b_2, b_3)$ is changed so that, whether the beam currently in use is $b_2$ or $b_3$, it always represents {signal level $RLev(b_2)$ using beam $b_2$} - {signal level $Rlev(b_3)$ using beam $b_3$}.

The BSW controller 84 generates an AZBST signal based on the receiving-level difference signal, and the AZ axis controller 104 generates an AZ axis control signal by adding this AZBST signal and the angular rate signal from on the basis of the receiving-level difference signal by supplying the AZ axis control signal to the servo-amplifier 82 via a switch 80, the HPF 102. The AZ axis controller 104 controls the AZ axis motor 28 so that the tracking error around the electronic XEL axis becomes small (BST around the AZ axis 14).

c. 5) XEL axis control by inclination angle

According to this embodiment, when the moving platform is inclined about the virtual XEL axis 100 shown in FIG. 100, the electronic XEL axis 10 is steered on the basis of the inclination angle about the virtual XEL axis 100. In other words, the BSW controller 84 controls the PSs 46 of the array antenna 22 according to the inclination angle about the virtual XEL axis 100 detected by the inclination detector 34b. For the sake of clarity, the symbol 10 that was used to denote a mechanical axis is used here for the XEL axis 10, however the XEL axis 10 in this embodiment is a virtual electronic axis with no mechanical representation. Further, according to this embodiment, the second virtual XEL axis 100 is used to detect the inclination angle of the moving platform. Although the virtual XEL axis 100 has no real mechanical representation, it is denoted by the symbol for a mechanical axis only for the sake of clarity. Further, it should be understood that the beam is not steered around the virtual XEL axis 100, i.e. the virtual XEL axis 100 is not an electronic axis. Further, the virtual XEL axis 100 is perpendicular to the AZ axis 14 in FIG. 10, but it need not be perpendicular. The virtual XEL axes 10 and 100 may be identical.

When the moving platform is inclined about the virtual XEL axis 100, i.e. when the inclination angle about the virtual XEL axis 100 is substantially apart from 0 position, the BSW controller 84 derives a control angle $\xi$ of the electronic XEL axis 10 based on an inclination angle $r_{XEL\#2}$ about the virtual XEL axis 100 detected by the inclination detector 34b. The BSW controller 84 then generates PS control signals such that the control angle $\xi$ is provided by the PSs 46. As the PSs 46 are of the digital control type, the control angle $\xi$ must be given as a quantized value:

$$\xi_q = [-r_{XEL\#2} \cdot \cos(\theta_{SO} - p_{EL})] \quad (1)$$

In the equation (1), [·] is a quantization function that selects the integer closest to its argument (herein corresponding to the beam position number), $\theta_{SO}$ is the declination from the zenith of the satellite (target) when there is no inclination, and $p_{EL}$ is the inclination angle of the moving platform about the electronic XEL axis 10.

The equation (1) is derived as follows. First, assume that the moving platform has inclined and a mount where the AZ axis 14 and EL axis 12 are both mechanical axes is mounted thereon. Further, it is assumed that the virtual XEL axis 100 is parallel to the AZ axis turntable 26, and that the inclination angle $r_{XEL\#2}$ of the moving platform about the virtual XEL axis 100, the error in the antenna azimuth (bearing error) $\Delta_{BRG}$ relative to the target azimuth in a coordinate system on the AZ axis turntable 26, and elevation direction error $\Delta_{EL}$ are not large. In this case, an apparent direction error angle $\Delta_{XEL}$ about the electronic XEL axis 10 due to the inclination may be approximated by:

$$\Delta_{XEL} = \Delta_{BRG} \cdot \sin(\theta_{SO} - p_{EL}) + r_{XEL\#2} \cdot \cos(\theta_{SO} - p_{EL}) \quad (2)$$

When the bearing error $\Delta_{BRG}$ in Equation (2) is sufficiently small and can substantially be regarded as 0, the error angle $\Delta_{XEL}$, i.e. $\Delta_{XEL}|_{\Delta_{BRG}=0}$, may be written:

$$_{XEL}|_{\Delta_{BRG}=0} = r_{XEL\#2} \cdot \cos(\theta_{SO} - p_{EL}) \quad (3)$$

The quantity $\Delta_{XEL}|_{\Delta_{BRG}=0}$ obtained from Equation (3) gives the apparent direction error angle about the electronic XEL axis 10 due to inclination. When the inclination angle $r_{XEL\#2}$ of the moving platform about the virtual XEL axis 100 is large, therefore, electronic XEL axis control can be performed using the inclination angle $r_{XEL\#2}$ detected by the inclination detector 34b. More specifically as shown in Equation (1) by substituting the inclination angle $r_{XEL\#2}$ in Equation (3) by the detected value thereof so as to find $\Delta_{XEL}|_{\Delta_{BRG}=0}$, and by quantizing this value after inverting its sign, the control angle $\xi_q$ can be obtained.

Please note that the Equation (2) is an approximate equation. For a method of deriving a exact equation, reference should be made to the section entitled "derivation of exact equations" at the end of the description of the embodiments, and to Japanese Patent Laid-Open Publication No. Hei 4-315301 or U.S. Pat. No. 5,223,845.

c. 6) Search control

When the target cannot be captured by the array antenna 22 after a predetermined time or longer or when the power supply is switched on, a search controller 92 shown in FIG. 7 performs following search-control. Firstly, the search controller 92 supplies an AZ axis search-control signal to the servo-amplifier 82 via the switch 80, and the AZ axis 14 is steered according to this signal. Through the period in which the search-control is performed, one of the following controls may be performed around the elevation; (a) the control of the angular position of the array antenna 22 to a control target initially set by the EL axis controller 62, (b) the control of the angular position of the array antenna 22 to a preceding elevation angle, and (c) the ZRC (zero rate control) to maintain the preceding elevation angle. Otherwise, similar search-control is also performed on the elevation. If the azimuth of the array antenna 22 is controlled in this way, the signal from the target will be preferably received at some point in time.

c. 7) Mode control

In order to perform the aforementioned controls, i.e. ZRC and BST about the AZ axis 14, the angular position control and step-track control around the EL axis 12, BSW around the electronic XEL axis 10 and control of the electronic XEL axis 10 by inclination angle about the virtual XEL axis 100 as well as search-control under predetermined conditions, a mode controller 94 inputs the elevation from the EL axis potentiometer 58 and the normal reception condition signal from the demodulator 54, generates a mode selection signal based thereon, and supplies it to the EL axis controller 62, BSW controller 84, AZ axis controller 104 and the switch 80.

Figure 11:
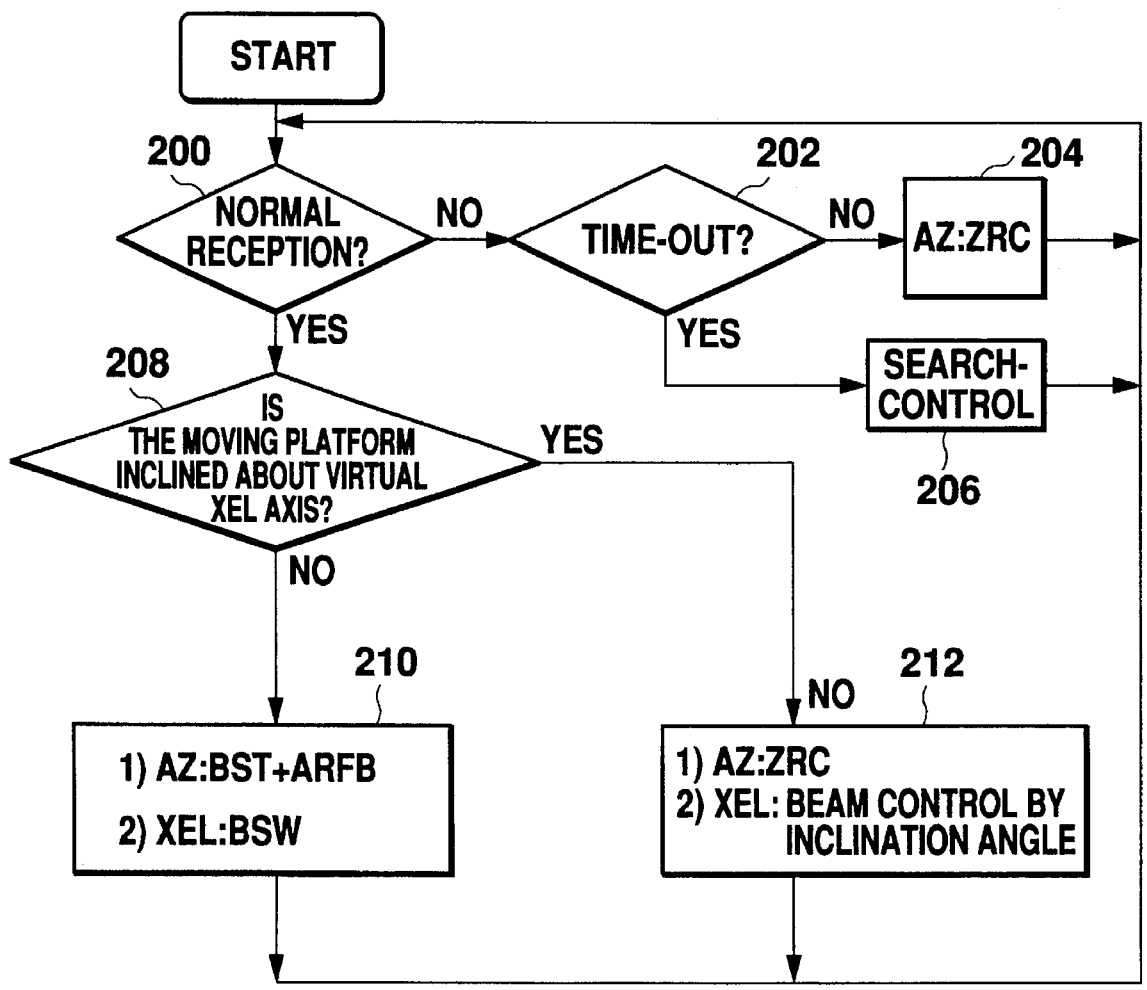
FIG. 11 is a flowchart showing a mode control operation according to the first embodiment.

FIG. 11 shows the flow of operations performed by the mode controller 94 according to this embodiment. In general, immediately after switching on power, the target is unseen by the array antenna 22. In response to the detection of this situation from the fact that the normal reception condition signal has not been obtained from the demodulator 54, the controller 94 supplies a mode selection signal to command the AZZRC mode to the controllers 62, 84 and 104, and controls the switch 80 such that the AZ axis controller 104 is connected to the servo-amplifier 82 (200). The EL axis controller 62 inputs the mode selection signal and then reads the initial set value of the elevation or a previous elevation value from the built-in memory, and controls the elevation of the array antenna 22 based on the read value. Also, the AZ axis controller 104 inputs the mode selection signal, generates an AZ axis control signal and controls the azimuth of the array antenna 22 bearing based on this signal (AZZRC, 204). According to this embodiment, the HPF 102 and other components operate in modes other than the AZZRC mode, so when the control mode is changed from another mode to the AZZRC mode, transient control delay due to start-up of the AZ axis controller 104 is avoided.

When the target has not been captured although the AZZRC mode has continued for a predetermined time or longer (202), the mode controller 94 outputs a mode control signal indicating the search mode (206) to activate the search controller 92 and to connect the search controller 92 to the servo-amplifier 82 via the switch 80. The EL axis controller 62, in responsive to the mode selection signal, then reads the initial set value of the elevation or a previous elevation value from the built-in memory, and controls the elevation of the array antenna 22 based on the read value. Also, the search controller 92, in responsive to the mode selection signal, generates an AZ axis search signal and controls the azimuth of the array antenna 22 based on this signal. The demodulator 54, in responsive to capturing of the target while the search mode or the AZZRC mode is being executed, outputs a normal reception condition signal. The mode controller 94 then determines whether or not the inclination angle about the virtual XEL axis 100 input from the inclination detector 34*b* can be regarded as substantially 0, i.e. whether or not the moving platform is substantially inclined about the virtual XEL axis 100 (208).

When it is determined that there is no substantial inclination, as the apparent azimuth error due to inclination is small, the mode controller 94 connects the AZ axis controller to the servo-amplifier 82 via the switch 80 by outputting a mode selection signal to change the control mode over to the AZBST mode (210). The BSW controller 84 then begins BSW using preferably the beam position pair ($b_2$, $b_3$). Also, the AZ axis controller 104 generates an AZ axis control signal by combining the AZBST signal from the BSW controller 84 and the angular rate signal from the HPF 102 by a method such as addition. The EL axis controller 62 performs angular position control or ZRC and step-track, to control the elevation of the array antenna 22.

When it is determined that there is a substantial inclination, the mode controller 94 connects the AZ axis controller 104 to the servo-amplifier 82 via the switch 80 by outputting a mode selection signal to change the control mode over to the AZZRC mode (212). The BSW controller 84 then steers the beam around the electronic XEL axis 10 using the inclination angle q about the virtual XEL axis 100. The EL axis controller 62 performs an angular position control or ZRC and a step-track control on the elevation of the array antenna 22.

According to this embodiment, therefore, it is unnecessary to use a gyrocompass or the like in order to obtain azimuth information. In other words, in the AZZRC mode, the bearing of the array antenna 22 is controlled such that the bearing of the array antenna 22 is held at the target's azimuth for a short time by performing ZRC around the AZ axis 14, and in the AZBST mode, as the AZ axis 14 is steered using the tracking error around the electronic XEL axis 10, there is no need for azimuth information from an external source in either mode.

If the mode were always the AZBST mode, there is a risk that the AZ axis 14 could suffer gimbal lock when the elevation angle is high, the inclination is large and the moving platform is inclined about the virtual XEL axis 100, however according to this embodiment the AZ axis 14 is steered by ZRC in such cases, hence gimbal lock does not easily occur even at the high elevation angle. Further, as is clear from Equation (3), when the inclination angle $r_{XEL\#2}$ of the moving platform about the virtual XEL axis 100 is sufficiently small so that the moving platform can be regarded as being substantially not inclined about the virtual XEL axis 100 (points A–C in FIG. 12), the apparent direction error angle due to inclination $\Delta_{XEL}|\Delta_{BRG=0}$ is substantially 0. Therefore, the true azimuth error may be detected by executing the AZBST mode, the target can be conveniently tracked around the AZ axis 14 using this result, and the direction error angle $\Delta_{XEL}$ can be set to substantially 0.

Please note that, in the AZBST mode, as the electronic XEL axis 10 is used only for BSW, a discussion similar to that concerning the aforesaid AZ-EL mount can also be applied. Further, the behavior of the parameters shown in FIG. 12 corresponds to the case where the elevation and azimuth of the satellite are respectively 75° and 45°, the target elevation and target azimuth of the array antenna 22 are respectively 75° and 45°, and the roll angle and pitch angle of the moving platform are respectively 25° every 15 seconds and 10° every 6 seconds. The reference of azimuth (0°) is the direction in which the moving platform advances.

Also according to this embodiment, when the normal reception condition signal is interrupted due to a blocking, etc., the AZZRC mode is executed for a limited predetermined time, and after this time has elapsed, the search mode is executed. In the AZZRC mode, as the bearing of the array antenna 22 is controlled so as to hold the azimuth thereof at the azimuth of the target as far as provided the time is short, the target can be conveniently tracked even when the signal from the target is being blocked. Further, when an AZBST signal is supplied from the BSW controller 84 to the AZ axis controller 104, the feedback control of an AZ axis angular rate signal to the AZ axis 14 steering system is performed in addition to the AZBST, providing stability of the control system of the AZ axis 14.

d) Functional construction of second embodiment

Figure 13:
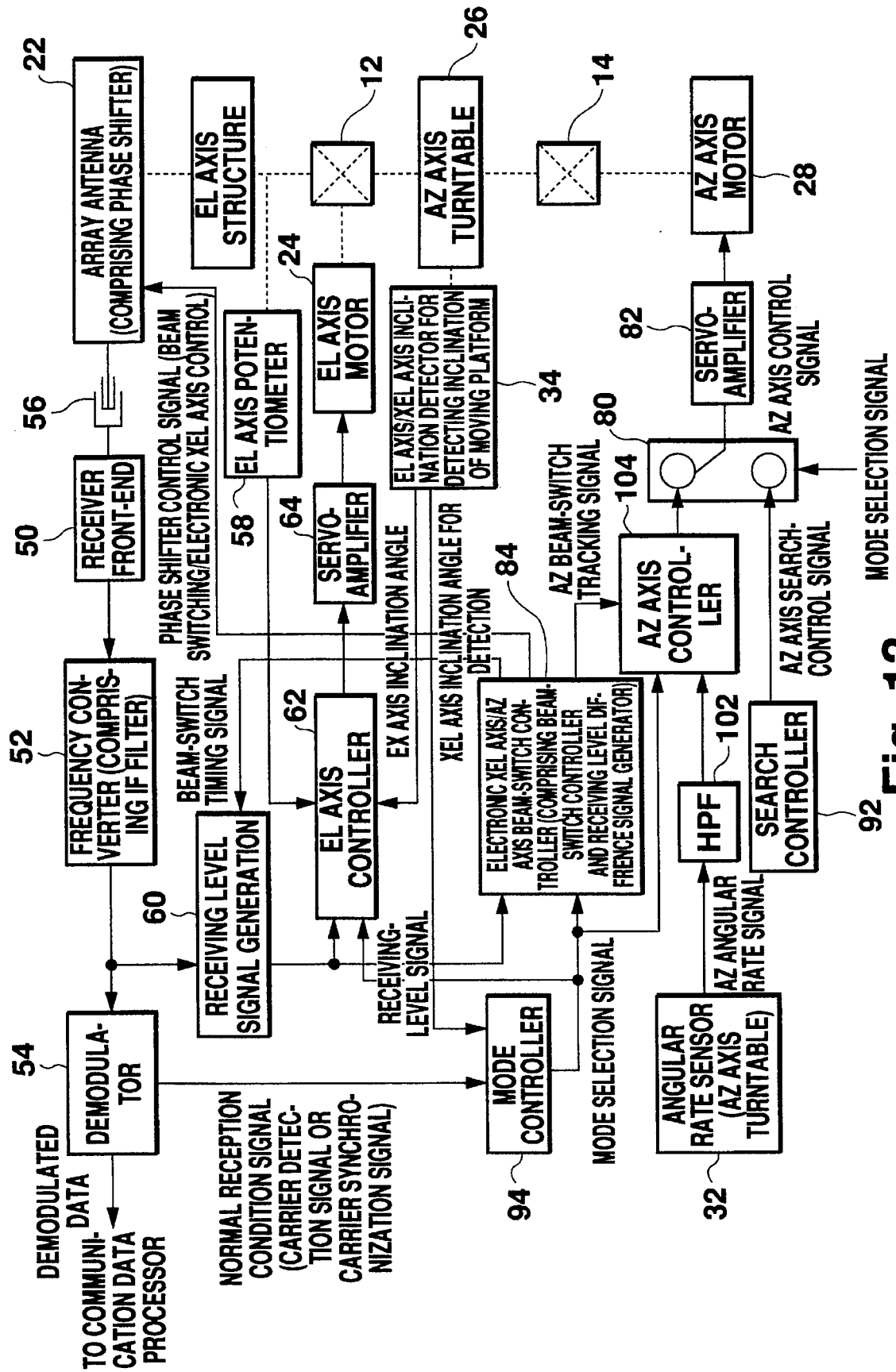
FIG. 13 is a full block diagram showing the functional layout of a tracking array antenna system according to a second embodiment of this invention.

FIG. 13 relates to a second embodiment of this invention, and shows a functional construction which can be applied to both a four-element and three-element embodiments. The main difference between this embodiment and the first embodiment is that electronic XEL axis control due to inclination angle in the first embodiment is not performed in this embodiment, BST around the electronic XEL axis being performed instead. The mode control is also different from that of the first embodiment. Hereinafter, to simplify the description, only those points which are different from the first embodiment will be discussed.

d. 1) XELBST

Figure 14:
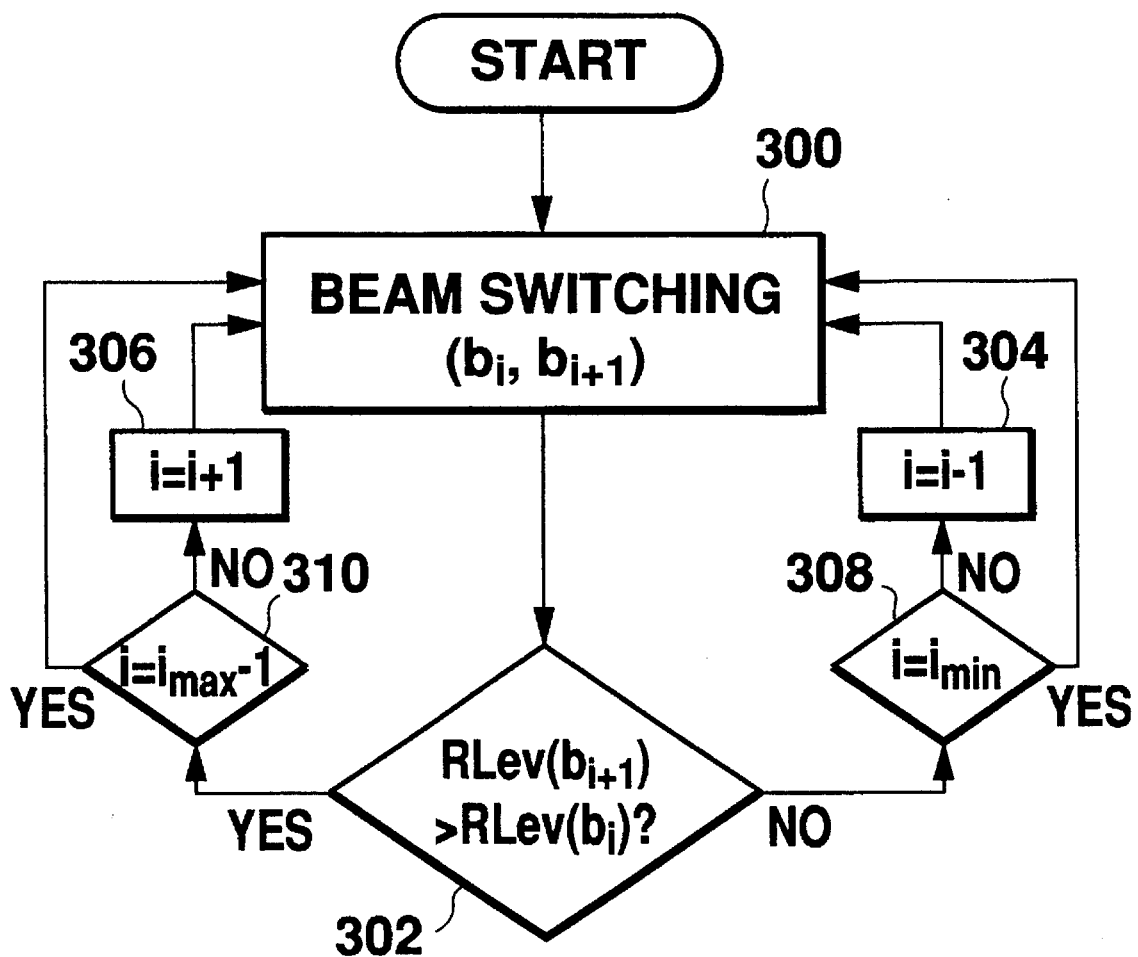
FIG. 14 is a flowchart showing a BST operation about the electronic XEL axis.

According to this embodiment, when the elevation of the array antenna 22 is sufficiently large and the moving platform is inclined about the virtual XEL axis 100, BST around the electronic XEL axis 10 is performed by BSW controller 84. Another structural difference from the first embodiment is that the inclination angle about the virtual XEL axis 100 is not supplied from the inclination detector 34 to the BSW controller 84. FIG. 14 shows the flow of operations of the BSW controller 84 to perform BST around the electronic XEL axis 10.

As shown in this figure, the BSW controller 84 performs BSW as in the case where BST around the AZ axis 14 is performed (300) and determines as to whether or not the beam position pair is to be modified (302). For example, if the current beam position pair is ($b_i$, $b_{i+1}$), the BSW controller 84 determines whether the value of the receiving-level difference signal $\Delta RLev$ ($b_i$, $b_{i+1}$)=$RLev(b_i)$−$RLev(b_{i+1})$ is positive or negative.

When this value is positive, i.e. when $R_{Lev}(b_i) > R_{Lev}(b_{i+1})$, it can be expected that a better signal level will be obtained if the beam position number is made smaller, i.e. if for example the beam position pair is changed from ($b_i$, $b_{i+1}$) to ($b_{i-1}$, $b_i$). In this case, the XEL axis/AZ axis BSW controller 84 subtracts 1 from i and continues BSW (304). Conversely, when $R_{Lev}(b_i) < R_{Lev}(b_{i+1})$, it can be expected that a improved signal level will be obtained if the beam position number is made larger, i.e. if for example the beam position pair is changed from ($b_i$, $b_{i+1}$) to ($b_{i+1}$, $b_{i+2}$). In this case, the BSW controller 84 adds 1 to i and continues BSW (306). As to whether the routine advances from step 302 to step 304 or step 306 when $R_{Lev}(b_i) = R_{Lev}(b_{i+1})$ is merely a design choice. When i has reached its minimum value imin (0 in FIG. 6), i cannot be decremented further, and when i+1 has reached its maximum value imax (6 in FIG. 6), i cannot be incremented further. Hence, when i=imin or i+1=imax, the steps 304 and 306 are omitted (308, 310).

In this way, the target can always be captured with a good receiving level. For example, when the target is in a direction indicated by S3 in FIG. 6 and BST around the electronic XEL axis using the beam position pair ($b_2$, $b_3$) is initially performed, the judgment $R_{Lev}(b_2) > R_{Lev}(b_3)$ is made, so the beam position pair is changed to ($b_1$, $b_2$). When BST around the electronic XEL axis is subsequently performed using the beam pair ($b_1$, $b_2$), it may be expected that $R_{Lev}(b_1) < R_{Lev}(b_2)$, so the beam position pair is changed to ($b_2$, $b_3$). Therefore, the beam position pair being used is alternately changed between ($b_1$, $b_2$) and ($b_2$, $b_3$). In other words, the beam direction around the electronic XEL axis 10 of the array antenna 22 is controlled so that a relatively good receiving-level is always obtained.

d. 2) Mode control

Figure 15:
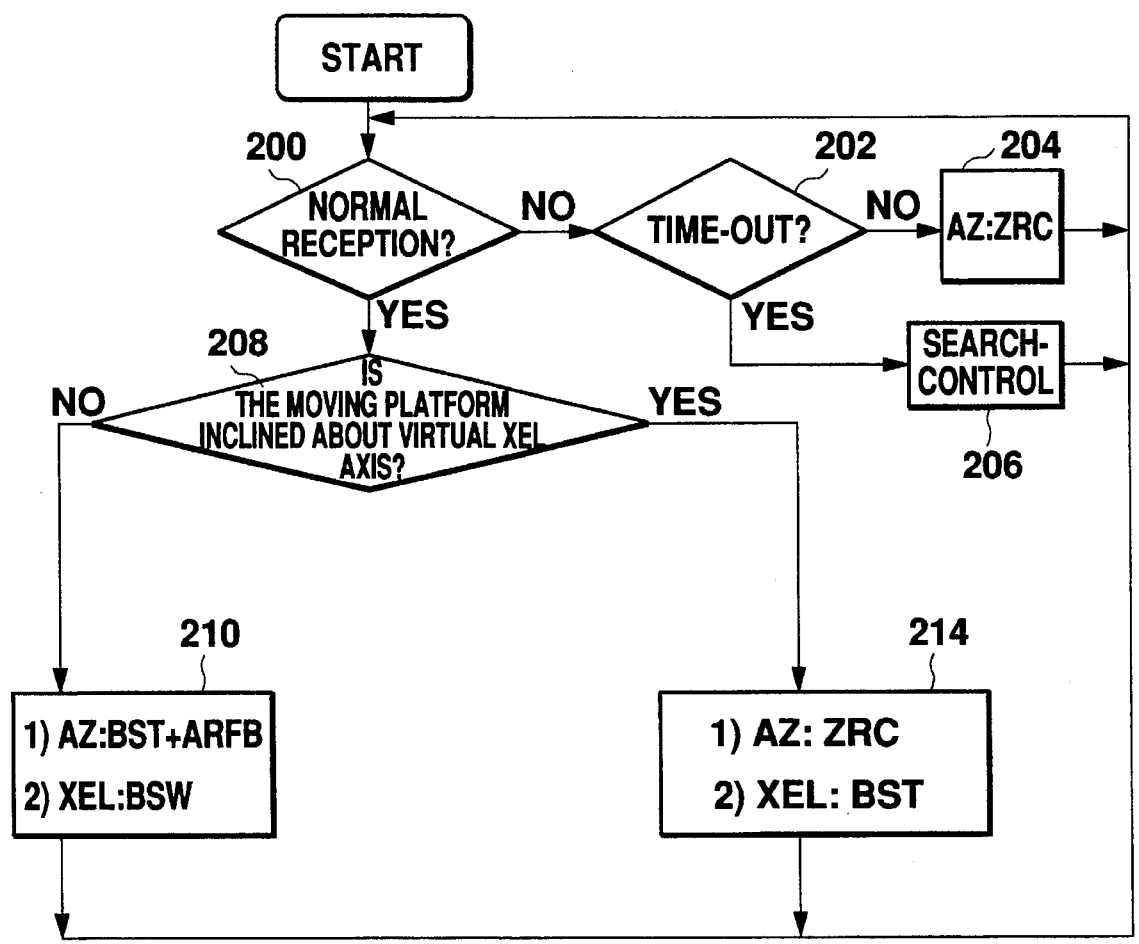
FIG. 15 is a flowchart showing a mode control operation according to the second embodiment.
Figure 16:
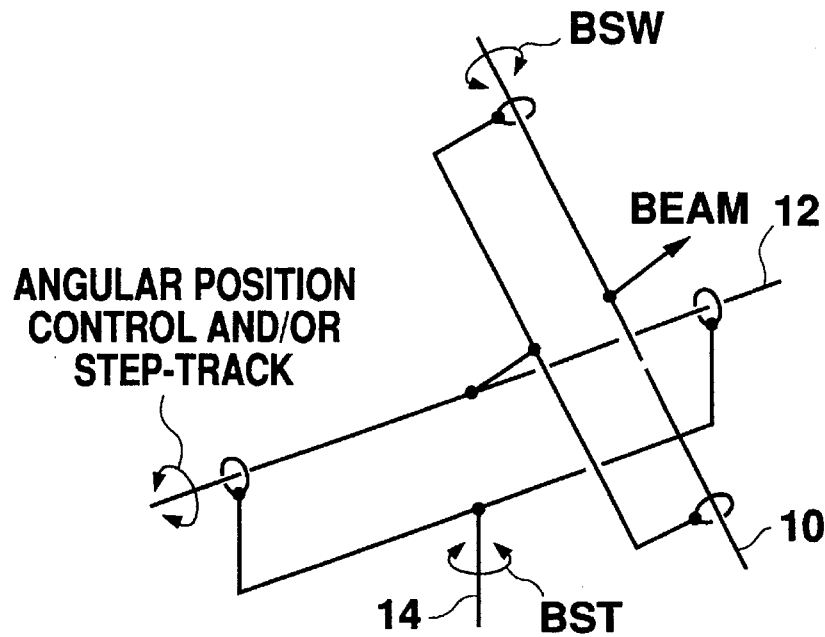
FIG. 16 is a diagram showing control conditions when a moving platform is substantially not inclined with respect to the virtual XEL axis for detecting inclination of the moving platform according to the second embodiment.
Figure 17:
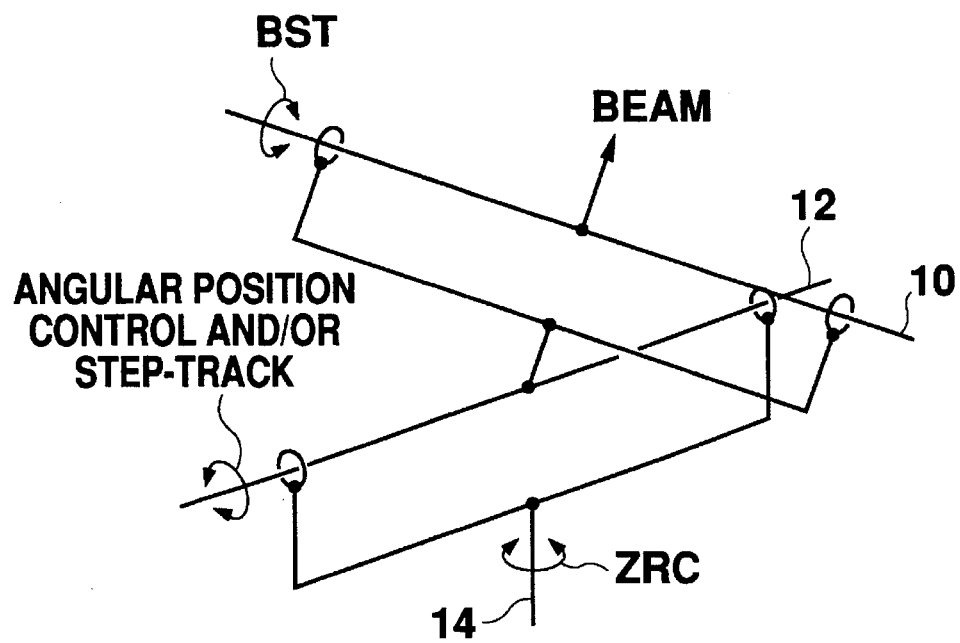
FIG. 17 is a diagram showing control conditions when a moving platform is substantially inclined with respect to the virtual XEL axis for detecting inclination of the moving platform according to the second embodiment.

FIG. 15 shows the flow of operations of the mode controller 94 according to this embodiment. The steps 200–210 are the same as those of the first embodiment and their description will therefore be omitted. The most important difference as regards mode control according to the first embodiment and mode control according to this embodiment is that when it is determined that the moving platform is substantially inclined about the virtual XEL axis 100 (208), XELBST about the electronic XEL axis 10 along with the ZRC about the AZ axis 14 is performed (214). In other words, whereas the control shown in FIG. 16 is performed as in the first embodiment when the moving platform is substantially not inclined about the virtual XEL axis 100, the control shown in FIG. 17 is performed when the moving platform is substantially inclined about the virtual XEL axis 100. More specifically, when it is determined in the step 208 that the moving platform is substantially inclined about the virtual XEL axis 100, the mode controller 94 outputs a mode selection signal to change the control mode over to the XEL BST mode (214), and in responsive thereto, the AZ axis controller 104 is connected to the servo-amplifier 82 via the switch 80, and BST around the electronic XEL axis 10 is started by the BSW controller 84. The EL axis controller 62 performs the angular position control or ZRC and step-track to control the elevation of the array antenna 2. It should be understood that although the XEL axis 10 has been drawn in FIG. 16 and FIG. 17, this axis is actually an electronic XEL axis.

According to this embodiment also, therefore, there is no need to obtain azimuth information from a gyrocompass or the like. Further, if the XELBST mode were always selected, the tracking error around the AZ axis 14 would accumulate. On the contrary, the XEL BST mode in this embodiment is executed after the azimuth error has been reduced by AZBST when the moving platform is not substantially inclined about the virtual XEL axis 100, so accurate tracking can be performed about both the AZ axis 14 and electronic XEL axis 10. If the AZBST mode were always selected on the other hand, there would be a risk of gimbal lock occurring when the inclination was large at high elevation angles, however as according to this embodiment AZBST is performed only when the moving platform is not substantially inclined about the virtual XEL axis 100, gimbal lock can be avoided even at a high elevation angle. Further, attention is made to the fact that "even at a high elevation angle gimbal lock can be avoided in spite of whether AZBST is performed as far as the moving platform is not substantially inclined about the virtual XEL axis 100", and thus the AZBST is performed only in such cases, and as a result the information regarding the receiving-level the target is effectively used. Still further, as the AZZRC mode is executed for a predetermined time when the normal reception condition signal is interrupted due to blocking, etc., and the search mode is elapsed when this predetermined time is exceeded, the same advantages as those of the first embodiment are obtained.

e) Third embodiment

Figure 18:
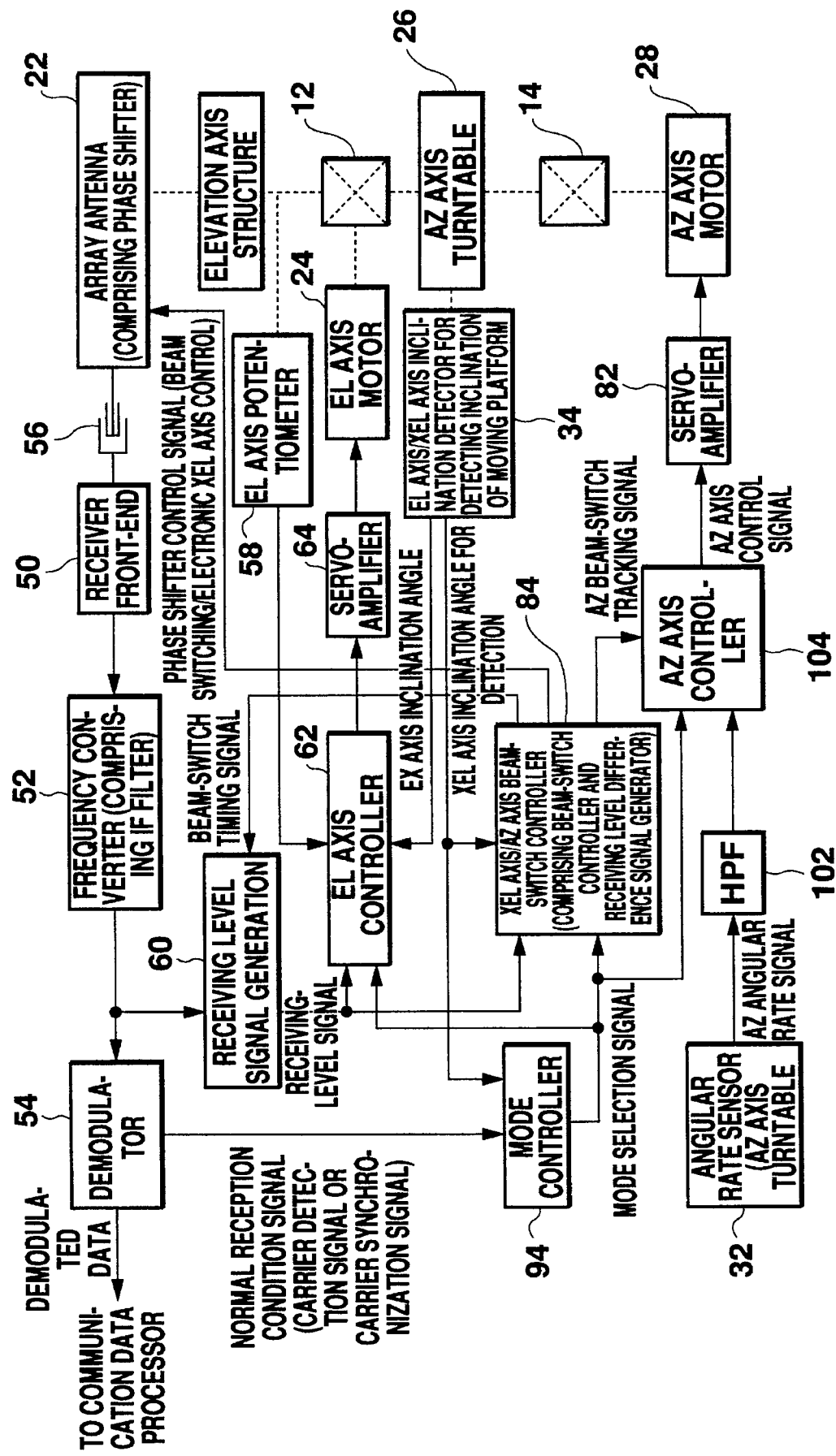
FIG. 18 is a full block diagram showing the functional layout of a tracking array antenna system according to a third embodiment of this invention.

FIG. 18 shows the construction of an array antenna according to a third embodiment of this invention. In the figure, the switch 80 and search controller 92 of the first embodiment are not used. According to this embodiment, therefore, the same results as those of the first embodiment are obtained excepting that search-control cannot be performed.

g) Derivation of exact equations

Here, to enhance understanding of the advantages of this invention, a description will be given of the derivation of the exact equation approximated by equation (2). In all the aforesaid embodiments, although the AZ-EL-electronic XEL mount is used, since the electronic XEL axis 10 is used for BSW when AZBST is executed and the satellite as the target is tracked exclusively by steering of the AZ axis 14 and EL axis 12, the control of the AZ - EL mount will be considered.

Here, let the true north coordinate system whose origin is set at the position of the ship or moving platform on which the antenna is mounted be represented by $X_O Y_O Z_O$. Let the azimuth of the satellite in this coordinate system be $\phi_{SO}$, the declination of the satellite from the zenith be $\theta_{SO}$, the azimuth angle of the moving platform be $\phi_V$, the roll angle be r, the pitch angle be p, the AZ angular position (antenna bearing angle) of the antenna relative to the reference thereof be $\phi_{AB}$, the declination angle of the EL axis 12 be $\theta_A$, the direction error angle about the electronic XEL axis 10 be $\Delta_{XEL}$, the direction error angle about the EL axis 12 be $\Delta_{EL}$, the inclination angle of the moving platform about the virtual XEL axis 100 detected by the inclination detector 34$b$ be $r_{XEL\#2}$, and the inclination angle of the moving platform about the EL axis 12 be $p_{EL}$. Further, assume that the virtual XEL axis 100 is parallel to the reference surface of the AZ axis turntable 26.

Along with these assumptions, to derive the inclination angle $r_{XEL\#2}$ of the moving platform about the virtual XEL axis and the inclination angle $p_{EL}$ of the moving platform about the EL axis 12. We shall consider the process of rotating a unit matrix I in the 0 coordinate system $X_O Y_O Z_O$ in accordance with the equation (4) and finally return to the unit matrix I.

$$I: X_O Y_O Z_O \xrightarrow{\phi_v} (a_{ij}); X_1 Y_1 Z_1 \qquad (4)$$
$$\xrightarrow{p} (b_{ij}); X_2 Y_2 Z_2$$
$$\xrightarrow{r} (c_{ij}); X_3 Y_3 Z_3$$
$$\xrightarrow{\phi_{AB}} (d_{ij}); X_4 Y_4 Z_4$$
$$\xrightarrow{-\gamma_{XEL\#2}} (e_{ij}); X_5 Y_5 Z_5$$
$$\xrightarrow{-P_{EL}} (f_{ij}); X_6 Y_6 Z_6$$
$$\xrightarrow{-\phi_7} (I); X_O Y_O Z_O$$

where $X_O Y_O Z_O$ is the true north coordinate system (0 coordinate system), $X_1 Y_1 Z_1$ - $X_6 Y_6 Z_6$ are the 1st–6th coordinate system, $a_{ij}$–$f_{ij}$ are 3×3 matrix elements (i=1-3, j=1-3), and I=3×3 unit matrix Representing this procedure as a matrix expression, $$I=(-\phi_7)_Z(-p_6)_Y(-r_5)_X(\phi_{AB})_Z(r)_X(p)_Y(\phi_V)_Z I \qquad (5)$$

Figure 19:
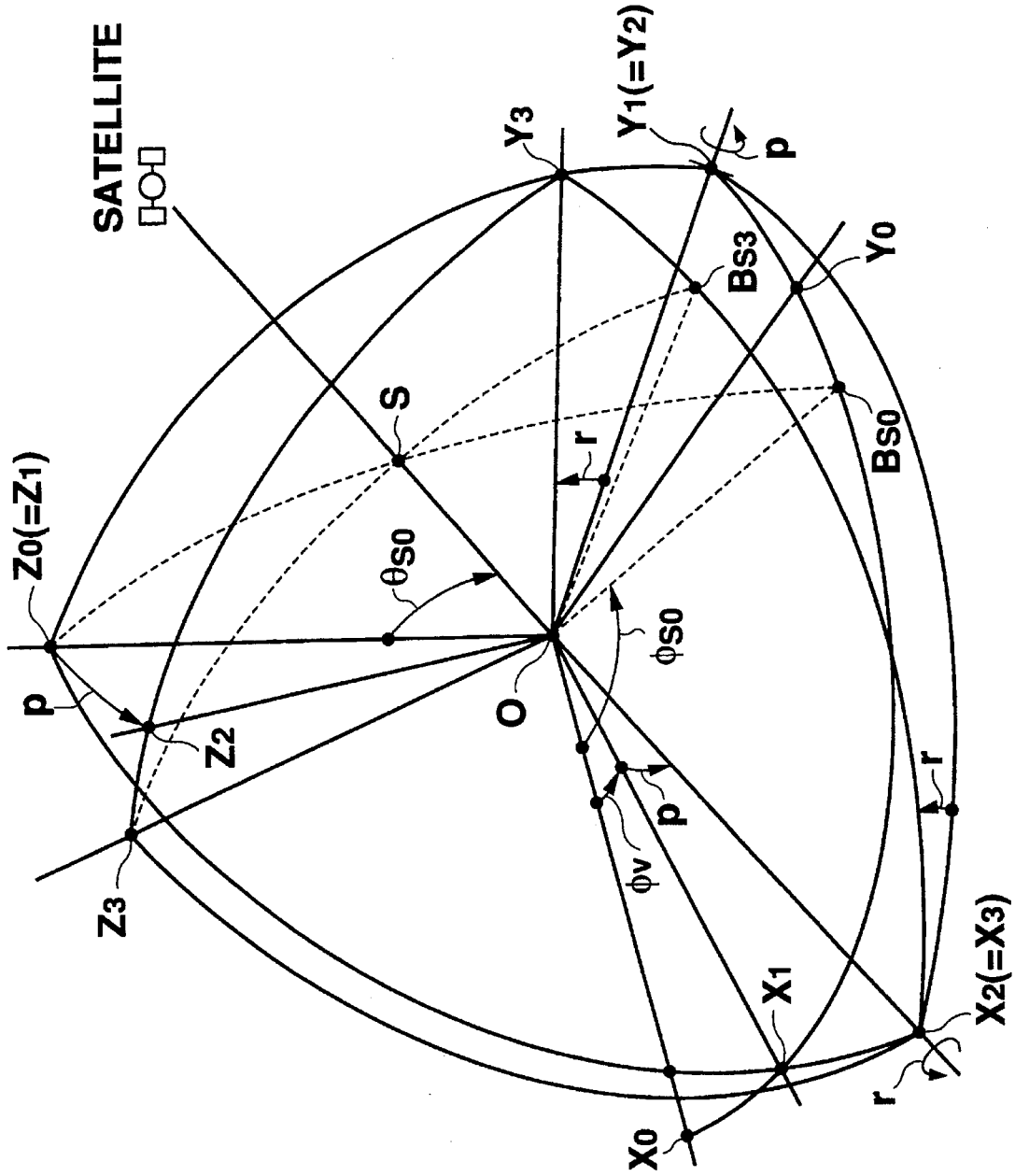
FIG. 19 is a coordinate diagram for the purpose of describing the principle of electronic XEL axis control according to the first embodiment of this invention.

In this equation, the matrix represented by $(.)_X$, $(.)_Y$, $(.)_Z$ is defined by $$(x)_X = \begin{pmatrix} 1 & 0 & 0 \\ 0 & \cos x & \sin x \\ 0 & -\sin x & \cos x \end{pmatrix} \qquad (6)$$

$$(y)_Y = \begin{pmatrix} \cos y & 0 & -\sin y \\ 0 & 1 & 0 \\ \sin y & 0 & \cos y \end{pmatrix}$$

$$(z)_Z = \begin{pmatrix} \cos z & \sin z & 0 \\ -\sin z & \cos z & 0 \\ 0 & 0 & 1 \end{pmatrix}$$

where x, y, z in equation (6) represent angles (radians) in brackets denoting the matrix in equation (5). The sequence of coordinate transformations from the $X_O Y_O Z_O$ coordinate system to the $X_3 Y_3 Z_3$ coordinate system is shown in FIG. 19.

Modifying the rotation equation thus obtained, and moving the matrix up to the third from the left of the right-hand side of equation (5) to the left-hand side, $$(r_5)_X((p_6)_Y(\phi_7)_Z=(\phi_{AB})_Z(r)_X(p)_Y(\phi V)_Z \qquad (7)$$

The right-hand of this equation (7) represents the aforesaid $(d_{ij})$, so $$(d_{ij})=(\phi_{AB})_Z(r)_X(p)_Y(\phi_V)_Z \qquad (8)$$

Further, expressing the left-hand side of equation (7) as $(d_{Lij})$, $$(d_{Lij}) = (r_5)X((p_6)Y(\phi_7)_Z \qquad (9)$$
$$= (\gamma_5)_X(p_6)_Y(\phi_7)_Z$$
$$= (d_{Lij}) = \begin{pmatrix} d_{L11} & d_{L12} & d_{L13} \\ d_{L21} & d_{L22} & d_{L23} \\ d_{L31} & d_{L32} & d_{L33} \end{pmatrix}$$

where $d_{L11}=\cos p_6 \cdot \cos \phi_7$ $d_{L12}=\cos p_6 \cdot \sin \phi_7$ $d_{L13}=-\sin p_6$ $d_{L21}=\sin r_5 \cdot \sin p_6 \cdot \cos \phi_7 - \cos r_5 \cdot \sin \phi_7$ $d_{L22}=\sin r_5 \cdot \sin p_6 \cdot \sin \phi_7 + \cos r_5 \cdot \sin \phi_7$ $d_{L23}=\sin r_5 \cdot \cos p_6$ $d_{L31}=\cos r_5 \cdot \sin p_6 \cdot \cos \phi_7 + \sin r_5 \cdot \sin \phi_7$ $d_{L32}=\cos r_5 \cdot \sin p_6 \cdot \sin \phi_7 - \sin r_5 \cdot \cos \phi_7$ $d_{L33}=\cos r_5 \cdot \cos p_6$ Herein, $(d_{ij})=(d_{Lij})$ must hold, therefore $d_{13}=d_{L13}$ must be true. As $d_{L13}=-\sin p_6$, $$P_{EL}=p_6=\sin^{-1} d_{13} \qquad (10)$$

Also, as $d_{23}=d_{L23}=\sin r_5 \cdot \cos p_6$ and $d_{33}=d_{L33}=\cos r_5 \cdot \cos p_6$, $$r_{XEL\#2}=r_5=\tan^{-1}(d_{23}/d_{33}) \qquad (11)$$

On the other hand, the equation representing direction error at $x_{SO}$, $y_{SO}$, $z_{SO}$ is $$\begin{pmatrix} \Delta x_s \\ \Delta y_s \\ \Delta z_s \end{pmatrix} = (-(\pi/2 - \theta_A + p_{EL}))_Y (\phi_{AB})_Z (r)_X (p)_Y (\phi_V)_Z \begin{pmatrix} x_{SO} \\ y_{SO} \\ z_{SO} \end{pmatrix} \qquad (12)$$

Converting this equation to a polar coordinate, $$\begin{pmatrix} \Delta x_s \\ \Delta y_s \\ \Delta z_s \end{pmatrix} = \begin{pmatrix} \sin\Delta\theta_s \cdot \cos\Delta\phi_s \\ \sin\Delta\theta_s \cdot \sin\Delta\phi_s \\ \cos\Delta\theta_s \end{pmatrix}$$

Thus, $$\Delta\theta_s=\cos^{-1} z_s, \Delta\phi_s=\tan^{-1}(\Delta y_s/\Delta x_s) \qquad (14)$$

Accordingly, $\Delta\theta_s$ is equal to $-\Delta_{EL}$, and $\Delta\phi_s$ is equal to $-\Delta_{XEL}$.

Figure 12:
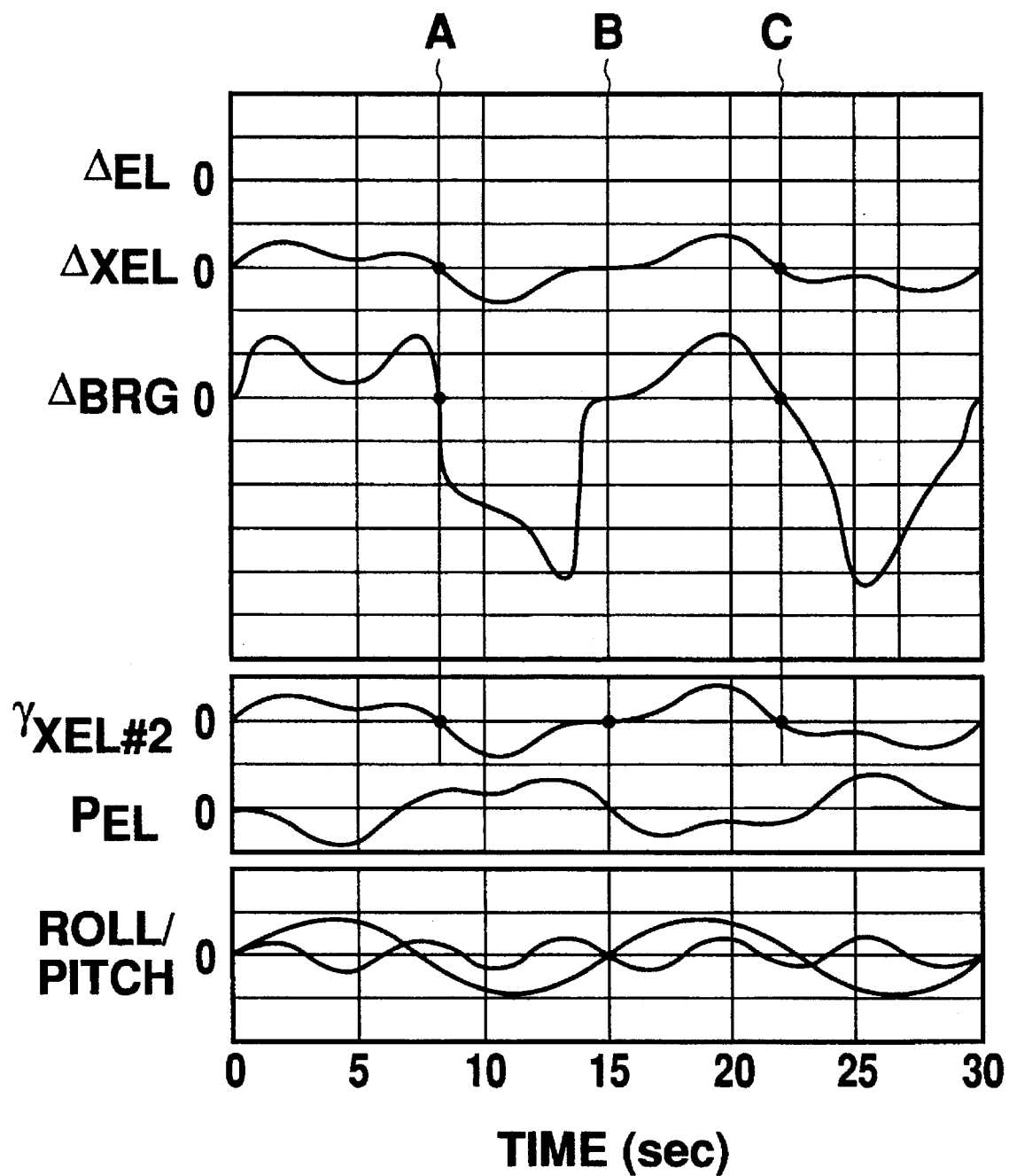
FIG. 12 is a diagram showing a geometrical directionality error of a mechanical AZ-mechanical EL mount.

Representing $p_{EL}$, $r_{XEL\#2}$, $\Delta_{EL}$ and $\Delta_{XEL}$ thus obtained in a schematic form, the aforesaid FIG. 12 is obtained. As is clear from this figure, in the case that $r_{XEL\#2}$ is substantially 0, i.e. when the moving platform is not substantially inclined about the XEL axis 100 for detecting the inclination angle of the moving platform, as far as the bearing error $\Delta_{BRG}$ is not too large, the direction error $\Delta_{XEL}$ about the electronic XEL axis 10 is substantially 0.

The aforesaid equation (2) is an approximation of equation (14).

h) Addendum

The controls of this invention can be implemented either by hardware or by software. The receiver front-end 50 and frequency converter 52 may be installed on the AZ axis turntable 26. Further, the elements 20 were arranged in 3 columns, however there is no limit to the number of columns of elements 20, nor to the number of elements 20 in each column. In FIG. 5, a feeding circuit for a four-element embodiment was shown, however those skilled in the art can modify the feeding circuit shown in FIG. 5 to one adaptable to the 3 element-embodiment shown in FIG. 2 or other types of arrangements. According to this invention, the bit number of PSs 46 is not limited to 3. The PS 46 may also have another construction provided that BSW is possible.

In the aforesaid description, adjacent beam positions were taken as pairs, however beam positions that are not adjacent can also be taken as pairs. Further, the determination of the step 302 in FIG. 14 was made on the basis of the sign of the receiving-level difference signals $\Delta R_{Lev}$, however receiving-level signals $R_{Lev}$ may be compared directly. Further, the step 302 may be executed after integrating the receiving-level difference signal $\Delta R_{Lev}$. In other words, the sign of $\Sigma \Delta R_{Lev}(b_i, b_{i+1})$ is determined, or $\Sigma R_{Lev}(b_i)$ and $\Sigma R_{Lev}(b_{i+1})$ may be compared. By performing this integration ("$\Sigma$"), noise in the receiving-level difference signal $\Delta R_{Lev}$ is eliminated, and thus the BST about the electronic XEL axis 10 becomes more stable. Also in this figure, when the selection of beam position pair is updated, an other beam position pair including a beam position included in the previous pair and which gave a better receiving-level than other beam position in the previous pair is selected, however as it is sufficient to perform this updating to select a beam position pair for which it appears that the receiving-level signal $R_{Lev}$ will probably improve, this invention is not limited to the updating method of FIG. 14.

Figure 20:
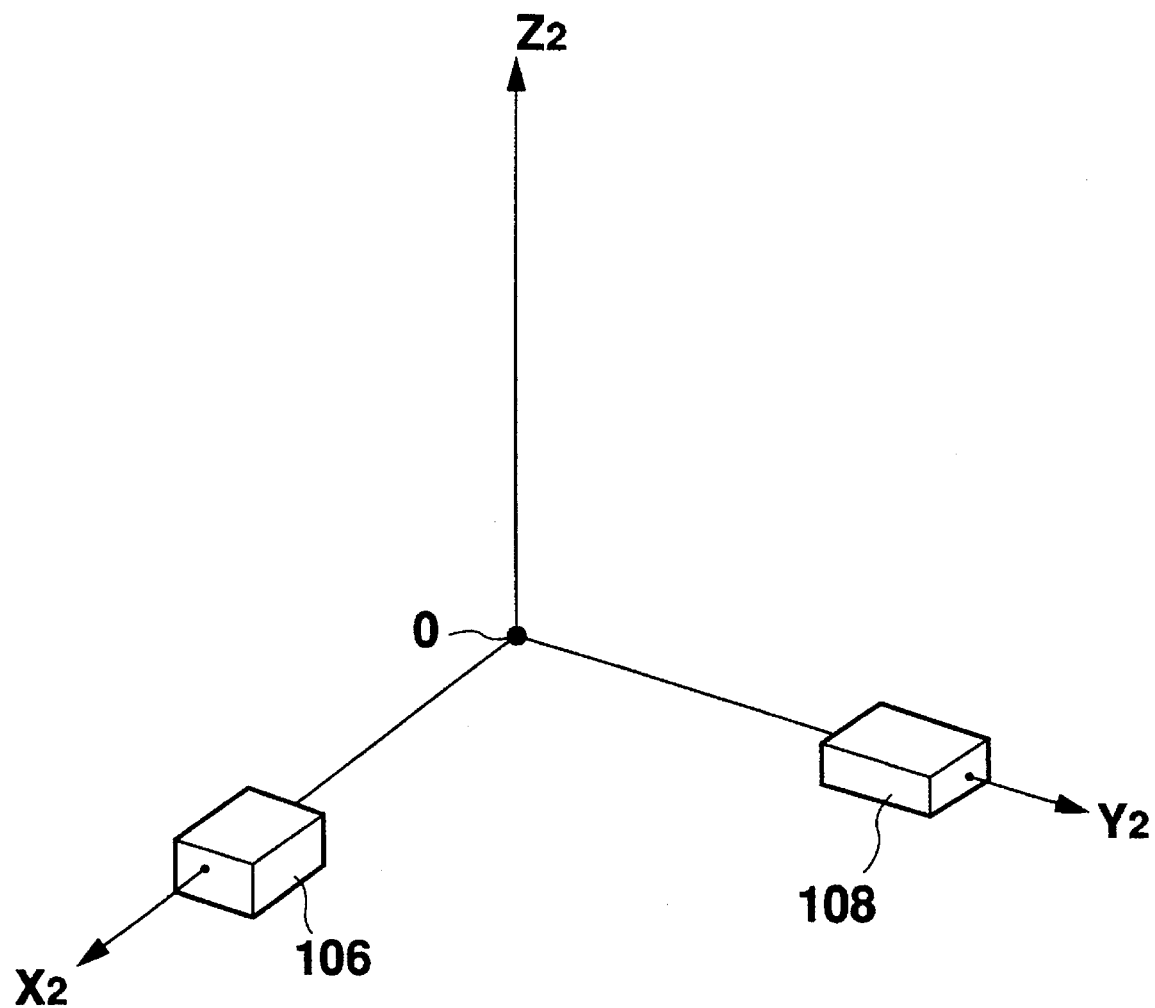
FIG. 20 is a diagram showing another method of detecting inclination.

Further, as shown in FIG. 20, the inclination $r_5$ and $p_6$ about the virtual XEL axis 100 may also be calculated, based on the output of a roll inclinometer 106, the output p of a pitch inclinometer 108 and the antenna bearing angle $\phi_{AB}$, inclinometers 106 and 108 being fixed together on the moving platform, according to equations (10) and (11).

Applicability of the present invention

This invention may be applied in particular to ship earth stations in the maritime satellite communications system managed by INMARSAT, however it is applicable to systems other than the INMARSAT ship earth stations. Further, the moving platform on which this system is mounted is not limited to a ship.

What is claim:

1. An array antenna system, suitable to be mounted on a moving platform, comprising an array antenna supported by and steerable about a mechanical elevation axis, said mechanical elevation axis being supported by and steerable about a mechanical azimuth axis, and said array antenna having a beam which selectively directs to of a plurality of beam positions around a first virtual cross-elevation axis that is perpendicular to said mechanical elevation axis and has no mechanical substance, beam-switch means for generating a tracking signal based on a signal received by said array antenna by selecting at least two of said plurality of beam positions and by forming the beam such that the beam alternately directs toward selected beam positions, second virtual cross-elevation axis inclination angle detecting means for generating a first inclination angle signal by directly or indirectly detecting an inclination angle of said moving platform a second virtual cross-elevation axis that is perpendicular to said mechanical elevation axis and has no mechanical substance, and azimuth axis beam-switch tracking means for steering said array antenna about said mechanical azimuth axis according to said tracking signal such that the azimuth of the array antenna approaches the azimuth of a target when it is determined that said moving platform is not inclined about said second virtual cross-elevation axis on the basis of at least said first inclination angle signal.

2. An array antenna as defined in claim 1, further comprising:

cross-elevation axis control means for forming said beam about said first virtual cross-elevation axis based on the inclination angle of said moving platform about said second virtual cross-elevation axis such that the signal from the target is received under better signal conditions when it is determined that said moving platform is inclined about said second virtual cross-elevation axis on the basis of said first inclination angle signal.

3. An array antenna system-as defined in claim 1 wherein said plurality of beams positions comprises at least 3 beam positions, said array antenna system further comprising:

cross-elevation axis beam-switch tracking means for updating said at least two beam positions to be alternately formed by said beam-switch means according to said tracking signal so that the signal from said target is received by said array antenna under better signal conditions when it is determined that said moving platform is inclined about said second virtual cross-elevation axis on the basis of said first inclination angle signal.

4. An array antenna system as defined in claim 1, further comprising:

azimuth axis angular rate detecting means for generating an angular rate signal by detecting an angular rate of the array antenna about said mechanical azimuth axis, and azimuth axis angular rate feedback control means for supplying a corrected tracking signal, generated by combining said angular rate signal with said tracking signal instead of the aforesaid tracking signal to said azimuth axis beam-switch tracking means when it is determined that said moving platform is not inclined about said second virtual cross-elevation axis on the basis of said first inclination angle signal.

5. An array antenna system as defined in claim 4 further comprising:

offset voltage suppressing means for generating an offset—suppressed angular rate signal by eliminating or attenuating an offset voltage contained in said angular rate signal, said offset-suppressed angular rate signal being supplied to said azimuth axis angular rate feedback means as the angular rate signal.

6. An array antenna system as defined in claim 1 further comprising:

search-control means for searching the position of the target by steering said array antenna about the mechanical azimuth axis and/or the mechanical elevation axis when the receiving signal quality s from the target deteriorate for a predetermined time or longer.

7. An array antenna system as defined in claim 1 further comprising:

elevation axis inclination angle detecting means for generating a second inclination angle signal by detecting an inclination angle of said array antenna about the mechanical elevation axis, and elevation axis control means for controlling said array antenna to track the elevation of said target while stabilizing the array antenna against inclination about the mechanical elevation axis by steering said array antenna about said mechanical elevation axis based on said second inclination angle signal, said elevation axis control means comprising elevation step-track means for controlling the elevation of said array antenna to a direction wherein signal reception quality is improved by monitoring signal reception from the target while varying the elevation of said array antenna in small steps.

\* \* \* \* \*